(12) United States Patent
Fukuda

(10) Patent No.: US 8,867,059 B2
(45) Date of Patent: Oct. 21, 2014

(54) IMAGE FORMING APPARATUS AND METHOD OF TRANSFERRING ADMINISTRATIVE AUTHORITY OF AUTHENTICATION PRINT DATA

(75) Inventor: Takafumi Fukuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 150 days.

(21) Appl. No.: 13/448,684

(22) Filed: Apr. 17, 2012

(65) Prior Publication Data

US 2012/0268770 A1 Oct. 25, 2012

(30) Foreign Application Priority Data

Apr. 20, 2011 (JP) ................................. 2011-094382

(51) Int. Cl.
*G06F 3/12* (2006.01)
*G06F 21/60* (2013.01)

(52) U.S. Cl.
CPC .................................... *G06F 21/608* (2013.01)
USPC ........................................ 358/1.14; 358/1.15

(58) Field of Classification Search
CPC .. G06K 15/4095; G06F 21/608; G06F 3/1238
USPC ............................................... 358/1.14, 1.15
See application file for complete search history.

(56) References Cited

U.S. PATENT DOCUMENTS

| 2010/0202006 A1* | 8/2010 | Nuggehalli et al. | 358/1.14 |
| 2011/0075202 A1* | 3/2011 | Shirai | 358/1.15 |
| 2011/0261402 A1* | 10/2011 | Yamamoto | 358/1.15 |

FOREIGN PATENT DOCUMENTS

JP 2005-335282 12/2005

* cited by examiner

*Primary Examiner* — Eric A Rust
(74) *Attorney, Agent, or Firm* — Kubotera & Associates, LLC

(57) ABSTRACT

An image forming apparatus includes a print administration unit for printing authentication print data; a server unit for providing a service; an authentication unit for controlling the server unit; and a notification transmission unit for transmitting a notice. The authentication unit obtains individual identification information. The server unit controls the external operation unit to display the authentication print data and an input screen. The print administration unit rewrites the identification information. The notification transmission unit transmits a first notification to the authority transferred person. After the authentication print data is printed, the notification transmission unit transmits a second notification to the authority transferred person and the print data creating person.

9 Claims, 20 Drawing Sheets

| Status | Job name | Print data creating person identification information | Print data administrator identification information | Print data generation date and time | Print computer name | Print data file name | Print data creating person mail address | Print data administrator mail address |
|---|---|---|---|---|---|---|---|---|
| Waiting Authentication State | JobName1 | User1 | User1 | 2010/10/01 09:05:40 | HOSTPC1 | 0000001.job | | |
| Waiting Authentication State | JobName2 | User2 | User2 | 2010/10/01 10:13:07 | HOSTPC2 | 0000002.job | | |
| Waiting Authentication State | JobName3 | User1 | User1 | 2010/10/02 17:25:37 | HOSTPC1 | 0000003.job | | |

FIG. 5

Authentication print data list screen — 90

| | Date/Time | Job Name | Computer Name | User Name |
|---|---|---|---|---|
| ☐ | 2010/10/1 9:05 | JobName1 | HostPC1 | User1 |
| ☑ | 2010/10/2 17:25 | JobName3 | HostPC1 | User1 |

92 — 91

When you are transferring administrative authority, follow the steps below.

STEP1: Check print data.

STEP2: Select individual identification information.

▼ 93      94

STEP3: Click authority transfer execution button.

[ Transfer execution ] — 95

FIG. 8

From: Printer

To :

Cc :

Bcc : User1_Print data creating person<User1@XXXX.jp>
      User3_Administrative authority transferred person<User3@XXXX.jp>

Title : Administrative authority transfer notification of authentication print

This mail is sent from Printer.

The administrative authority of the following authentication print is transferred from User1 to User3.

Date: 2010/10/02 17:25:37

Apparatus: Printer

Document: AuthDocument.text

FIG. 13

From: Printer

To :

Cc :

Bcc : User1_Print data creating person<User1@XXXX.jp>
User3_Administrative authority transferred person<User3@XXXX.jp>

Title : Completion notification of authentication print

This mail is sent from Printer.

The authentication print data with the administrative authority thereof transferred from User1 to User 3 is completed.

Date: 2010/11/02 11:01:00

Apparatus: Printer (XXX.XXX.XXX.XXX)

Printing person: User3

Document: AuthDocument.text

Printed sheet number: 50

FIG. 14

| 401 | 402 | 403 | 404 | 405 | 406 | 407 | 408 | 409 | 410 |
|---|---|---|---|---|---|---|---|---|---|
| Status | Job name | Print data creating person identification information | Print data administrator identification information | Print data generation date and time | Print computer name | Print data file name | Print data creating person mail address | Print data administrator mail address | Print data deletion process flag |
| Waiting Authentication State | Job Name1 | User1 | User1 | 2010/10/01 09:05:40 | HOSTPC1 | 0000001.job | | | 0 |
| Waiting Authentication State | Job Name2 | User2 | User2 | 2010/10/01 10:13:07 | HOSTPC2 | 0000002.job | | | 0 |
| Waiting Authentication State | Job Name3 | User1 | User1 | 2010/10/02 17:25:37 | HOSTPC1 | 0000003.job | | | 0 |

Authentication print data list screen

|   | Date/Time | Job Name | Computer Name | User Name |
|---|---|---|---|---|
| ☐ | 2010/10/1 9:05 | JobName1 | HostPC1 | User1 |
| ☐ | 2010/10/2 17:25 | JobName3 | HostPC1 | User1 |

92 When you are transferring administrative authority, follow the steps below. 91

STEP1: Check print data.

STEP2: Select individual identification information (up to five users).

93A(93A-1)   94A(94A-1)
93A(93A-2)   94A(94A-2)
93A(93A-3)   94A(94A-3)
93A(93A-4)   94A(94A-4)
93A(93A-5)   94A(94A-5)

STEP3: Select deletion method when you select more than one user in STEP 2.

96 ● Delete when one of administrative authority transferred persons completes printing operation (one of administrative authority transferred persons obtains printing result).

97 ○ Delete when all of administrative authority transferred persons complete printing operation (all of administrative authority transferred persons obtain printing result).

STEP4: Click authority transfer execution button.

[Transfer execution] 95

FIG. 16

| | | 400A | | | | | | | |
|---|---|---|---|---|---|---|---|---|---|
| 401 | 402 | 403 | 404 | 405 | 406 | 407 | 408 | 409 | 410 |

| Status | Job name | Print data creating person identification information | Print data administrator identification information | Print data generation date and time | Print computer name | Print data file name | Print data creating person mail address | Print data administrator mail address | Print data deletion process flag |
|---|---|---|---|---|---|---|---|---|---|
| Waiting Authentication State | Job Name1 | User1 | User1 | 2010/10/02 17:25:37 | HOSTPC1 | 0000001.job | | | 0 |

FIG. 19(a)

| | | 400A | | | | | | | |
|---|---|---|---|---|---|---|---|---|---|
| 401 | 402 | 403 | 404 | 405 | 406 | 407 | 408 | 409 | 410 |

| Status | Job name | Print data creating person identification information | Print data administrator identification information | Print data generation date and time | Print computer name | Print data file name | Print data creating person mail address | Print data administrator mail address | Print data deletion process flag |
|---|---|---|---|---|---|---|---|---|---|
| Waiting Authentication State | Job Name1 | User1 | User2 | 2010/10/02 17:25:37 | HOSTPC1 | 0000001.job | User1@XXXX X.jp | User2@XXXX X.jp | ※1 |
| Waiting Authentication State | Job Name1 | User1 | User3 | 2010/10/02 17:25:37 | HOSTPC1 | 0000001.job | User1@XXXX X.jp | User3@XXXX X.jp | ※1 |

※ 1 : Vary according to selected deletion method.
   1: When "delete when one of administrative authority transferred persons complete printing operation" is selected.
   0: When "delete when all of administrative authority transferred persons complete printing operation" is selected.

FIG. 19(b)

From: Printer

To :

Cc :

Bcc : User1_Print data creating person<User1@XXXX.jp>
  User2_Administrative authority transferred person 1<User2@XXXX.jp>
  User3_Administrative authority transferred person 2<User3@XXXX.jp>

Title : Administrative authority transfer notification of authentication print

---

This mail is sent from Printer.

The administrative authority of the following authentication print is transferred from User1 to User 2 and User3

Date: 2010/10/02 17:25:37

Apparatus: Printer

Document: AuthDocument.text

*The accumulated authentication print data will be deleted when one of the users to whom the administrative authority is transferred performs the printing operation.

FIG. 20

From: Printer

To :

Cc :

Bcc : User1_Print data creating person<User1@XXXX.jp>
User2_Administrative authority transferred person 1<User2@XXXX.jp>
User3_Administrative authority transferred person 2<User3@XXXX.jp>

Title : Completion notification of authentication print

This mail is sent from Printer.

The authentication print data with the administrative authority thereof transferred from User1 to User2 and User3 is completed, and the accumulated authentication print data is deleted.

Date: 2010/11/02 11:01:00

Apparatus: Printer (XXX.XXX.XXX.XXX)

Printing person: User3

Document: AuthDocument.text

Printed sheet number: 50

FIG. 21

IMAGE FORMING APPARATUS AND METHOD OF TRANSFERRING ADMINISTRATIVE AUTHORITY OF AUTHENTICATION PRINT DATA

BACKGROUND OF THE INVENTION AND RELATED ART STATEMENT

The present invention relates to an image forming apparatus and a method of transferring administrative authority of authentication print data.

In a conventional image forming apparatus or a conventional method of transferring administrative authority of authentication print data, first, a computer transmits the authentication print data, and the authentication print data is stored in the conventional image forming apparatus. Then, an ID (Identification) and a password are input in the conventional image forming apparatus. Lastly, the ID and the password are compared with identification information contained in the authentication print data, thereby performing a printing operation.

Patent Reference has disclosed the conventional image forming apparatus. According to patent Reference, an IC card reader is connected to the conventional image forming apparatus. Then, an RFID (Radio Frequency Identification) card moves over the ID reader, so that the ID reader reads specific information from the RFID card. Lastly, the specific information is compared with the identification information contained in the authentication print data, thereby performing the printing operation.

Patent Reference; Japanese Patent Publication No. 2005-335282

In the conventional image forming apparatus or the conventional method of transferring the administrative authority of the authentication print data disclosed in patent Reference, after a person creates the authentication print data with the computer, it is not possible to transfer the administrative authority of the authentication print data to somebody else. Accordingly, it is necessary for the person to authenticate the authentication print data to perform the printing operation.

In view of the problems described above, an object of the present invention is to provide an image forming apparatus capable of solving the problems of the conventional image forming apparatus or the conventional method of transferring the administrative authority of the authentication print data.

Further objects and advantages of the invention will be apparent from the following description of the invention.

SUMMARY OF THE INVENTION

In order to attain the objects described above, according to a first aspect of the present invention, an image forming apparatus is configured to receive authentication print data and perform a printing operation.

According to the first aspect of the present invention, the image forming apparatus includes a print administration unit for printing the authentication print data when individual identification information matches to identification information of a print data administrator of the authentication print data; a server unit for providing a service relative to an instruction from an external operation unit through a network; an authentication unit for controlling the server unit to be capable of providing the service after a user of the external operation unit is authenticated; and a notification transmission unit for transmitting a notice through the network.

According to the first aspect of the present invention, in the image forming apparatus, the authentication unit is configured to authenticate the user of the external operation unit and obtain the individual identification information. When the individual identification information related to the user of the external operation unit matches to the identification information of the print data administrator of the authentication print data, the server unit is configured to control the external operation unit to display the authentication print data to be selectable. Further, the server unit is configured to control the external operation unit to display a screen through which identification information of an authority transferred person, to whom administrative authority of the authentication print data is transferred, can be input.

According to the first aspect of the present invention, in the image forming apparatus, the print administration unit is configured to rewrite the identification information of the print data administrator of the authentication print data selected through the external operation unit with the identification information of the authority transferred person. When the print data administrator of the authentication print data is rewritten, the notification transmission unit is configured to transmit a first notification to the authority transferred person rewritten to the print data administrator and a print data creating person. After the authentication print data is printed, the notification transmission unit is configured to transmit a second notification to the authority transferred person and the print data creating person.

According to a second aspect of the present invention, a method is for transferring administrative authority of authentication print data to be printed with an image forming apparatus.

According to the second aspect of the present invention, the method of transferring the administrative authority of the authentication print data includes the steps of: authenticating a user of an external operation unit; obtaining individual identification information related to the user of the external operation unit; displaying the authentication print data to be selectable when the individual identification information related to the user of the external operation unit matches to identification information of a print data administrator of the authentication print data; displaying a screen through which identification information of an authority transferred person, to whom administrative authority of the authentication print data is transferred, can be input; rewriting the identification information of the print data administrator of the authentication print data selected through the external operation unit with the identification information of the authority transferred person; transmitting a first notification to the authority transferred person rewritten to the print data administrator and a print data creating person; and transmitting a second notification to the authority transferred person and the print data creating person after the authentication print data is printed.

According to the first aspect and the second aspect of the present invention, in the image forming apparatus and the method of transferring the administrative authority of the authentication print data, it is possible to obtain the following effects.

First, after the authentication print data is printed on an upper apparatus, it is possible to safely transfer the administrative authority of the authentication print data to the user thus specified.

Second, according to the first aspect of the present invention, the image forming apparatus includes the server unit. Accordingly, when the external operation unit is operated through the upper apparatus, it is possible to transfer the administrative authority of the authentication print data. As a result, it is possible to perform the printing operation of the authentication print data and the transfer operation of the administrative authority of the authentication print data on the single upper apparatus, thereby making it unnecessary to move to other location and improving efficiency.

Third, according to the first aspect of the present invention, the image forming apparatus includes the server unit. Further, when the administrative authority of the authentication print data is transferred, the external operation unit of the upper apparatus is used to display the authentication print data stored therein and input the identification information of the authority transferred person. Accordingly, even when the image forming apparatus is provided with a small operation panel and an input unit of the image forming apparatus includes only a few buttons, it is possible to efficiently input the information.

BRIEF DESCRIPTION OF THE DRAWINGS

FIG. 5 is a schematic view showing a print data administration table according to the first embodiment of the present invention;

FIG. 8 is a schematic view showing an authentication print data list screen of the web server unit of the image forming apparatus according to the first embodiment of the present invention;

FIG. 13 is a schematic view showing a first mail to be transmitted from the image forming apparatus when the administrative authority is transferred according to the first embodiment of the present invention;

FIG. 14 is a schematic view showing a second mail to be transmitted from the image forming apparatus when the printing operation is completed according to the first embodiment of the present invention;

FIG. 15 is a schematic view showing an example of a print data administration table according to a second embodiment of the present invention;

FIG. 16 is a schematic view showing an authentication print data list screen of a web server unit of an image forming apparatus according to the second embodiment of the present invention;

FIG. 19(a) is a schematic view showing the print data administration table before the administrative authority is transferred according to the second embodiment of the present invention;

FIG. 19(b) is a schematic view showing the print data administration table after the administrative authority is transferred according to the second embodiment of the present invention;

FIG. 20 is a schematic view showing a first mail to be transmitted from the image forming apparatus when the administrative authority is transferred according to the second embodiment of the present invention; and FIG. 21 is a schematic view showing a second mail to be transmitted from the image forming apparatus when the printing operation is completed according to the second embodiment of the present invention.

DETAILED DESCRIPTION OF PREFERRED EMBODIMENTS

Hereunder, embodiments of the present invention will be explained with reference to the accompanying drawings. It is noted that the drawings are presented for an explanation purpose only, and the present invention is not limited to the embodiments.

First Embodiment

Figure 1:
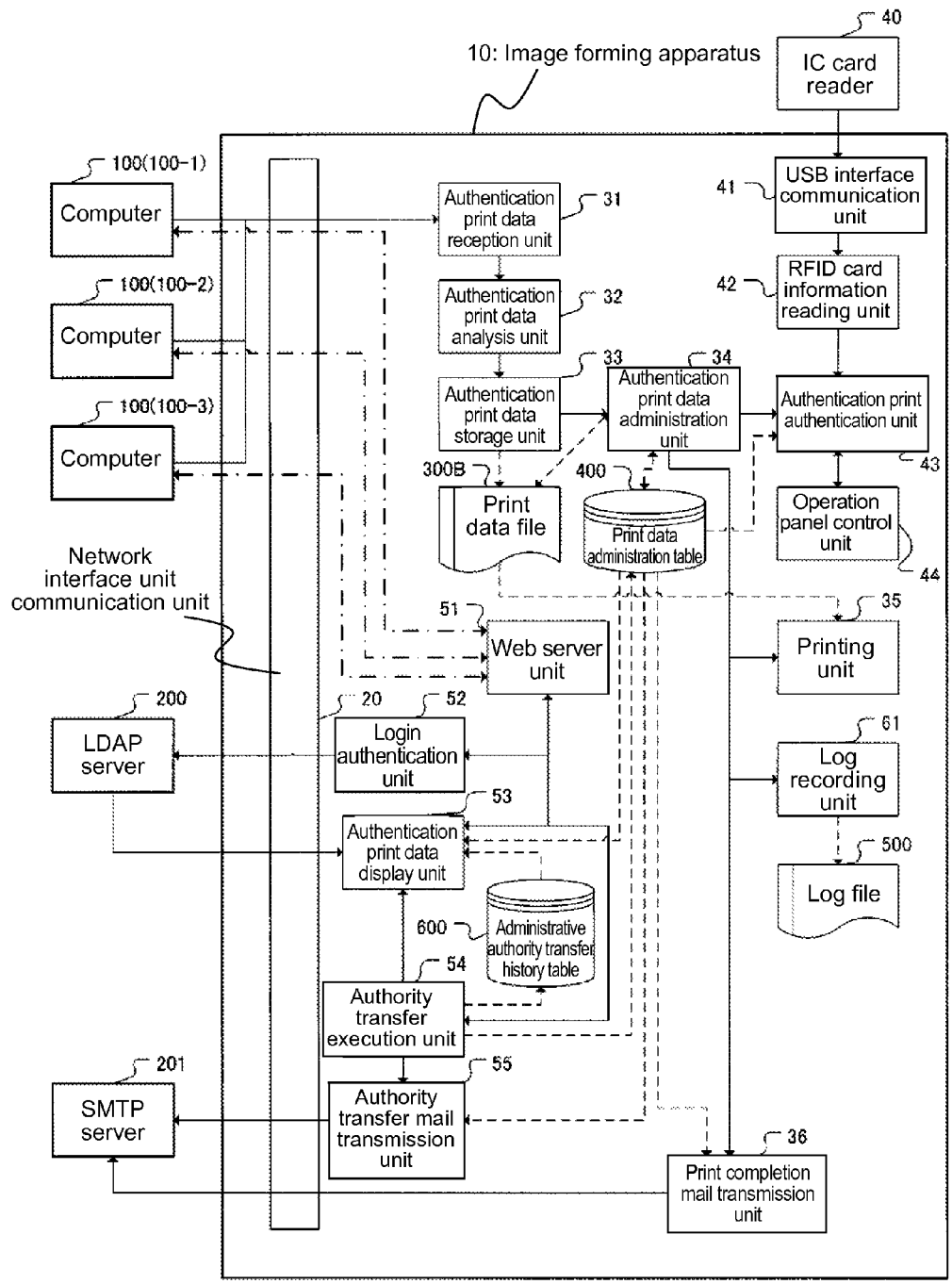
FIG. 1 is a block diagram showing a configuration of an image forming apparatus according to a first embodiment of the present invention.

A first embodiment of the present invention will be explained. FIG. 1 is a block diagram showing a configuration of an image forming apparatus 10 according to the first embodiment of the present invention.

In FIG. 1, it is noted that a solid line with an arrow represents a flow of communication between apparatus and a control inside the image forming apparatus 10. Further, a hidden line with an arrow represents an input or an output to or from a file or a database, and a projected line with an arrow represents an access from a web browser 130 of a computer 100 to the image forming apparatus 10.

In the embodiment, the image forming apparatus 10 is an apparatus capable of receiving authentication print data, and of performing a printing operation.

As shown in FIG. 1, the image forming apparatus 10 includes a network interface unit communication unit 20; an authentication print data reception unit 31 as a reception unit; an authentication print data analysis unit 32; an authentication print data storage unit 33 as a storage unit; an authentication print data administration unit 34 as a print administration unit; a printing unit 35; and a print completion mail transmission unit 36 for transmitting a notification, (for example, a mail) of print completion.

In the embodiment, the image forming apparatus 10 further includes a USB (Universal Serial Bus) interface communication unit 41; an RFID (Radio Frequency Identification) card information reading unit 42; an authentication print authentication unit 43; and an operation panel control unit 44.

In the embodiment, the image forming apparatus 10 further includes a web server unit 51 as a server unit; a login authentication unit 52 as an authentication unit; an authentication print data display unit 53; an authority transfer execution unit 54; an authority transfer mail transmission unit 55 for transmitting a notification (for example, a mail) of authority transfer; and a log recording unit 61.

In the embodiment, the image forming apparatus 10 is connected to an IC card reader 40 through USB. Further, the image forming apparatus 10 is connected to a plurality of computers 100 (=100-1 to 100-3), an LDAP (Lightweight Directory Access Protocol) server 200, and an SMTP (Simple Mail Transfer Protocol) server 201 through a network 70 (described later).

Figure 2:
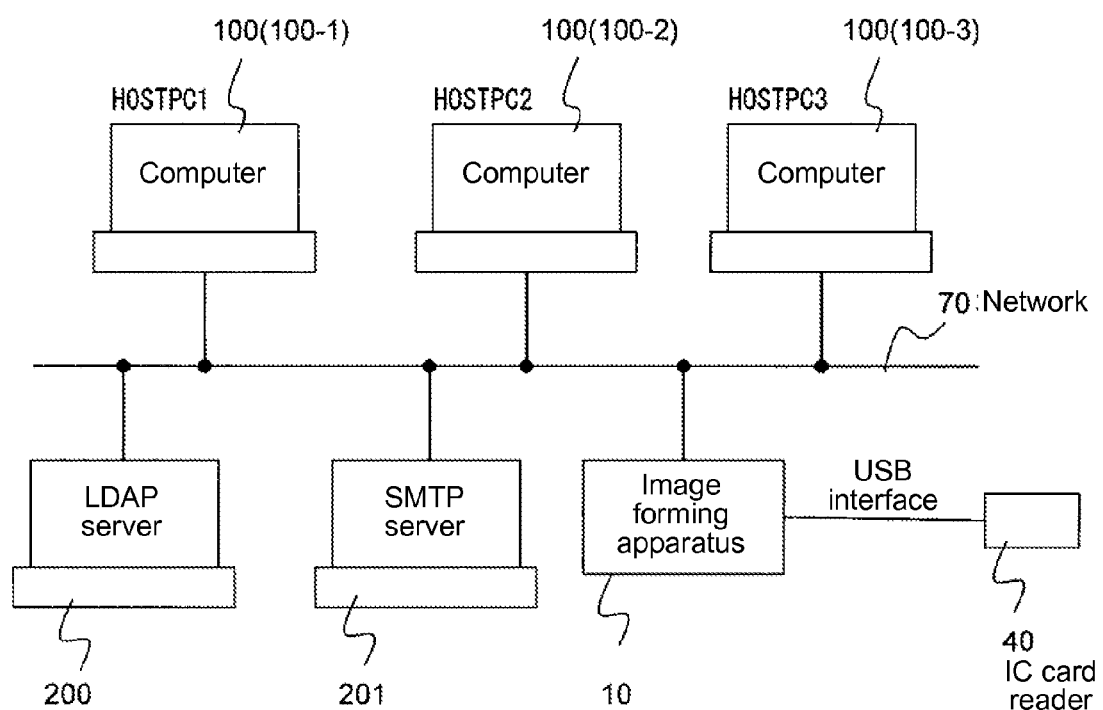
FIG. 2 is a block diagram showing a network system of the image forming apparatus according to the first embodiment of the present invention.

In the embodiment, the network interface unit communication unit 20 is connected to the network 70 as shown in FIG. 2 (described later), so that the network interface unit communication unit 20 is capable of communicating through the network 70. More specifically, the network interface unit communication unit 20 is capable of communicating the computers 100 (=100-1 to 100-3), the LDAP server 200, and the SMTP server 201 connected to the network 70.

In the embodiment, the authentication print data reception unit 31 is connected to an output side of the network interface unit communication unit 20 and the authentication print data analysis unit 32. The authentication print data reception unit 31 is configured to receive authentication print data 300A transmitted from the computers 100 (=100-1 to 100-3) and having individual information of an operator through the network interface unit communication unit 20, and to transmit the authentication print data 300A to the authentication print data analysis unit 32.

In the embodiment, the authentication print data analysis unit 32 is connected to an output side of the authentication print data reception unit 31 and the authentication print data storage unit 33. The authentication print data analysis unit 32 is configured to analyze the authentication print data 300A transmitted from the authentication print data reception unit 31. Accordingly, the authentication print data analysis unit 32 is configured to extract print data administration information and individual identification information contained in the authentication print data 300A, and to transmit the print data administration information and the individual identification information to the authentication print data storage unit 33.

In the embodiment, the authentication print data storage unit 33 is connected to an output side of the authentication print data analysis unit 32 and the authentication print data administration unit 34. The authentication print data storage unit 33 is configured to store the authentication print data 300A to a print data file 300B, and to transmit the print data administration information and the individual identification information to the authentication print data administration unit 34.

In the embodiment, the authentication print data administration unit 34 is connected to an output side of the authentication print data storage unit 33, the authentication print authentication unit 43, the printing unit 35, the log recording unit 61, and the print completion mail transmission unit 36. The authentication print data administration unit 34 is configured to administrate the print data file 300B, and the print data administration information and the individual identification information related to the print data file 300B using a print data administration table 400. When the individual identification information matches to identification information of a print data administrator related to the print data file 300B, the authentication print data administration unit 34 performs the printing operation of the print data file 300B.

In the embodiment, the USB interface communication unit 41 is connected to an output side of the IC card reader 40 through an USB interface, and further to the RFID card information reading unit 42. The USB interface communication unit 41 is configured to communicate with the IC card reader 40 through the USB interface.

In the embodiment, the RFID card information reading unit 42 is connected to an output side of the USB interface communication unit 41 and the authentication print authentication unit 43. The RFID card information reading unit 42 is configured to read specific information contained in an RFID card through the USB interface communication unit 41 when the RFID card moves over the IC card reader 40. The specific information may include, for example, identification information of an owner of the RFID card.

In the embodiment, the authentication print authentication unit 43 is connected to an output side of the RFID card information reading unit 42, and further to the authentication print data administration unit 34 and the operation panel control unit 44. The authentication print authentication unit 43 is configured to compare the individual identification information administered with the authentication print data administration unit 34 with the individual identification information generated from the information read with the RFID card information reading unit 42. Accordingly, the authentication print authentication unit 43 is configured to determine whether the authentication print data 300A is printed.

In the embodiment, the operation panel control unit 44 is connected to the authentication print authentication unit 43. The operation panel control unit 44 is configured to display information on an operation panel 45, and further to receive an execution instruction input from the operation panel 45.

In the embodiment, the log recording unit 61 is connected to an output side of the authentication print data administration unit 34. The log recording unit 61 is configured to record the individual identification information and the administration information of the authentication print data 300A in a log file 500 after the authentication print data 300A is printed.

Figure 3:
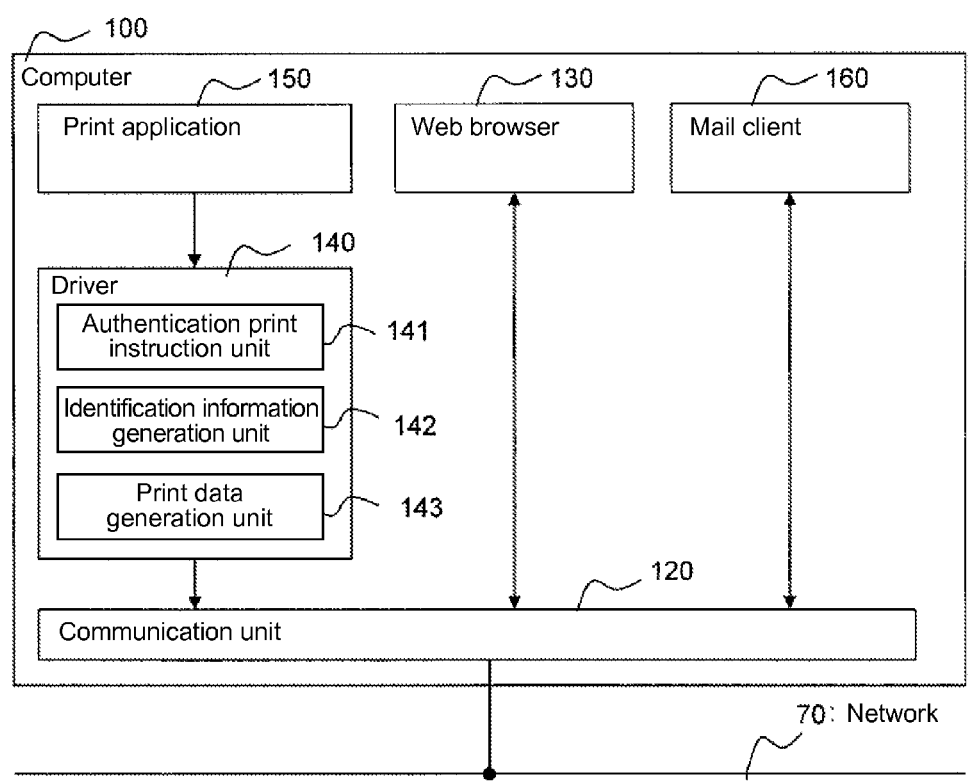
FIG. 3 is a block diagram showing a configuration of a computer according to the first embodiment of the present invention.

In the embodiment, the web server unit 51 is connected to the network interface unit communication unit 20, the login authentication unit 52, the authentication print data display unit 53, the authority transfer execution unit 54, and the authority transfer mail transmission unit 55. The web server unit 51 is configured to mutually communicate with the web browser 130 of the computers 100 (=100-1 to 100-3) as shown in FIG. 3 (described later), so that a screen is displayed on the web browser 130. Further, the web server unit 51 is configured to provide a service relative to an instruction from the web browser 130.

In the embodiment, the login authentication unit 52 is connected to the web server unit 51 and the network interface unit communication unit 20. The login authentication unit 52 is configured to receive a login command from the web browser 130 of the computers 100 (=100-1 to 100-3) as shown in FIG. 3 (described later). Further, the login authentication unit 52 is configured to inquire the LDAP server 200 to determine whether an ID and a password related to the login command are authentic, so that the login authentication unit 52 determines whether the login command is received.

In the embodiment, the authentication print data display unit 53 is connected to the web server unit 51, the output side of the network interface unit communication unit 20, and an output side of the authority transfer execution unit 54. The authentication print data display unit 53 is configured to receive the instruction from the web browser 130 of the computers 100 (=100-1 to 100-3) as shown in FIG. 3 (described later) through the web server unit 51. Further, the authentication print data display unit 53 is configured to display a list display screen of the authentication print data 300A including the individual identification information related to the ID authenticated with the login authentication unit 52, and to display an input screen through which the individual identification information of an authority transferred person, to whom the administrative authority of the authentication print data is transferred, can be input. Further, the authentication print data display unit 53 is configured to transmit the list display screen and the input screen to the web browser 130 of the computers 100 (=100-1 to 100-3).

In the embodiment, the authority transfer execution unit 54 is connected to the web server unit 51, the authentication print data display unit 53, and the authority transfer mail transmission unit 55. The authority transfer execution unit 54 is configured to receive the authentication print data 300A to which the administrative authority is transferred and the input of the individual identification information of the authority transferred person, to whom the administrative authority of the authentication print data is transferred from the web browser 130 of the computers 100 (=100-1 to 100-3) as shown in FIG. 3 (described later) through the web server unit 51. Further, the authority transfer execution unit 54 is configured to update the print data administration table 400 and transfer the administrative authority, so that an administrative authority transfer history table 600 is updated.

In the embodiment, the authority transfer mail transmission unit 55 is connected to an output side of the authority transfer execution unit 54 and the network interface unit communication unit 20. The authority transfer mail transmission unit 55 is configured to transmit a first mail, which indicates that the administrative authority is transferred, to a print data creating person and the print data administrator as the authority transferred person, when the authority transfer execution unit 54 transfers the administrative authority.

In the embodiment, the print completion mail transmission unit 36 is connected to the output side of the authentication print data administration unit 34 and the network interface unit communication unit 20. The print completion mail transmission unit 36 is configured to transmit a second mail, which indicates that the printing operation is completed, to the print data creating person and the print data administrator as the authority transferred person, when the printing operation of the authentication print data 300A to which the administrative authority is transferred is completed.

FIG. 2 is a block diagram showing the network system of the image forming apparatus 10 according to the first embodiment of the present invention.

As shown in FIG. 2, the network system includes the computers 100 (=100-1 to 100-3), the LDAP server 200, the SMTP server 201, the image forming apparatus 10, and the network 70. In the network system, the computers 100 (=100-1 to 100-3), the LDAP server 200, the SMTP server 201, and the image forming apparatus 10 are connected to the network 70. Further, the IC card reader 40 is connected to the image forming apparatus 10 through the USB interface.

In the embodiment, a name "HOSTPC1" is assigned to the computer 100-1, so that the computer 100-1 is identified on the network 70. Further, a user of the computer 100-1 has the identification information "User1". Further, a name "HOSTPC2" is assigned to the computer 100-2, so that the computer 100-2 is identified on the network 70. Further, a user of the computer 100-2 has the identification information "User2". Further, a name "HOSTPC3" is assigned to the computer 100-3, so that the computer 100-3 is identified on the network 70. Further, a user of the computer 100-3 has the identification information "User3".

FIG. 3 is a block diagram showing a configuration of the computer 100 according to the first embodiment of the present invention.

As shown in FIG. 3, the computer 100 includes a print application 150; a driver 140; the web browser 130 as an external operation unit; a mail client 160; and a communication unit 120. The print application 150 is formed of document creation software, DTP software, and the like, and is provided for instructing the driver 140 to print a document, a drawing, and an image. When the driver 140 receives an instruction from the print application 150, the driver 140 generates normal print data or the authentication print data 300A. The communication unit 120 is configured to transmit the normal print data or the authentication print data 300A generated with the driver 140 to the image forming apparatus 10.

As shown in FIG. 3, the driver 140 includes an authentication print instruction unit 141, an identification information generation unit 142; and a print data generation unit 143.

In the embodiment, the authentication print instruction unit 141 is configured to specify the normal print data or the authentication print data 300A to be generated. When the authentication print instruction unit 141 specifies the authentication print data 300A to be generated, the identification information generation unit 142 is configured to attach the individual identification information of the print data creating person to the authentication print data 300A. The print data generation unit 143 is configured to generate the print data in a format specified with the authentication print instruction unit 141.

In the embodiment, the web browser 130 is provided for displaying data received from the web server unit 51 of the image forming apparatus 10 connected to the network 70 through the communication unit 120. Further, the web browser 130 is provided for transmitting data input through a keyboard and a mouse (not shown) to the web server unit 51 of the image forming apparatus 10.

In the embodiment, the mail client 160 is provided for displaying mail data received from the SMTP server 201 connected to the network 70, and for transmitting the mail data input through the keyboard and the mouse (not shown) to the SMTP server 201.

Figure 4:
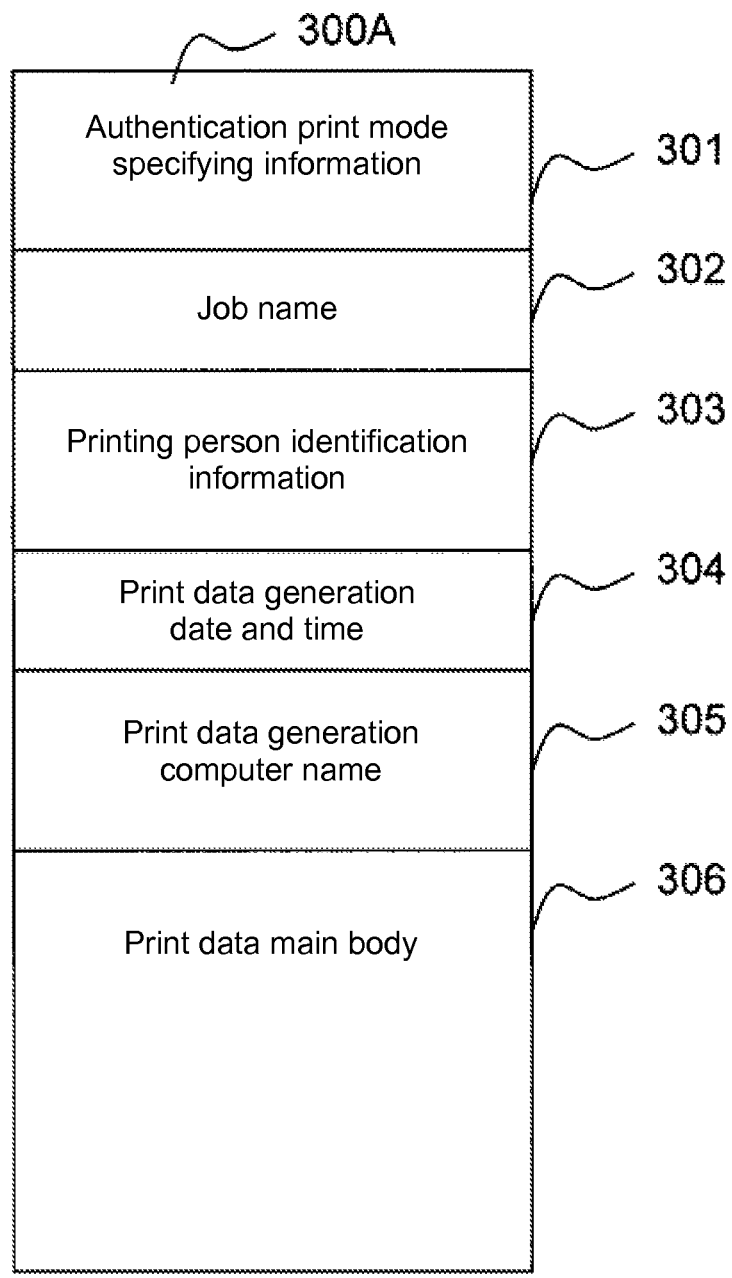
FIG. 4 is a schematic view showing a format of authentication print data according to the first embodiment of the present invention.

FIG. 4 is a schematic view showing a format of the authentication print data 300A according to the first embodiment of the present invention.

As shown in FIG. 4, the authentication print data 300A includes an authentication print mode specifying information 301; a job name 302; a printing person identification information 303; a print data generation date and time 304; a print data generation computer name 305; and a print data main body 306.

In the embodiment, the authentication print mode specifying information 301 is information indicating that the print data is authenticated. When the image forming apparatus 10 receives the print data, the image forming apparatus 10 is configured to determine whether the print data is printed right away or is stored without printing according to the authentication print mode specifying information 301.

In the embodiment, the job name 302 is a name specified with the print application 150, or a name set with the driver 140 according to an instruction of the print data creating person. More specifically, the print data creating person uses the job name 302 to differentiate each of a plurality of print data.

In the embodiment, the printing person identification information 303 is information capable of uniquely identifying the print data creating person who creates the print data, and the identification information generation unit 142 of the driver 140 is configured to generate the printing person identification information 303. More specifically, the printing person identification information 303 corresponds to the information recorded in the RFID card, or the information obtained through a specific database with the information recorded in the RFID card as a key.

In the embodiment, the print data generation date and time 304 is information representing a date and a time when the print data creating person creates the print data, so that the operator of the image forming apparatus 10 uses the print data generation date and time 304 to identify the print data. The print data generation computer name 305 is information for identifying the computer 100, with which the print data creating person creates the print data, on the network 70, so that the operator of the image forming apparatus 10 uses the print data generation computer name 305 to identify the print data. The print data main body 306 is print command data generated with the driver 140, and is used to form and print an image on a recording medium.

FIG. 5 is a schematic view showing the print data administration table 400 according to the first embodiment of the present invention.

As shown in FIG. 5, the print data administration table 400 includes a plurality of records corresponding to each print job. Each of the records corresponds to each row of the print data administration table 400 shown in FIG. 5. More specifically, each of the records includes a job name 402; a print data creating person identification information 403; a print data administrator identification information 404; a print data generation date and time 405; a print computer name 406; a print data file name 407; a print data creating person mail address 408; and a print data administrator mail address 409.

In the embodiment, a status 401 is provided for storing a current status of the authentication print data 300A such as "Waiting Authentication State", "In Printing State", and "In Locked State". When the IC card reader 401 shows "Waiting Authentication State", it is indicated that the image forming apparatus 10 is in a state capable of performing the printing operation. When the IC card reader 401 shows "In Printing State", it is indicated that the image forming apparatus 10 is performing the printing operation. When the IC card reader 401 shows "In Locked State", it is indicated that the image forming apparatus 10 is in the transition of status, and the access to the image forming apparatus 10 is prohibited. An initial value of the IC card reader 401 is set to "Waiting Authentication State". As shown in FIG. 5, the status "Waiting Authentication State" is stored in all of the records.

In the embodiment, the job name 302 related to the authentication print data 300A is stored in the job name 402. Further, the printing person identification information 303 of the authentication print data 300A is stored in the print data creating person identification information 403. Similarly, the printing person identification information 303 of the authentication print data 300A is stored in the print data administrator identification information 404. It is noted that an initial value of the print data creating person identification information 403 is always the same information as an initial value of the print data administrator identification information 404.

In the embodiment, the print data generation date and time 304 of the authentication print data 300A is stored in the print data generation date and time 405. Further, the print data generation computer name 305 of the authentication print data 300A is stored in the print computer name 406. Further, the file name of the print data file 300B is stored in the print data file name 407. It is noted that the authentication print data storage unit 33 is configured to generate the print data file 300B.

In the embodiment, when the administrative authority of the authentication print data 300A is transferred, the print data creating person mail address 408 obtained from the LDAP server 200 is stored in the print data creating person mail address 408. As shown in FIG. 5, nothing is stored in the print data creating person mail address 408 at this moment.

In the embodiment, when the administrative authority of the authentication print data 300A is transferred, the mail address of the authority transferred person obtained from the LDAP server 200 is stored in the print data administrator mail address 409. As shown in FIG. 5, nothing is stored in the print data administrator mail address 409 at this moment.

Figure 6:
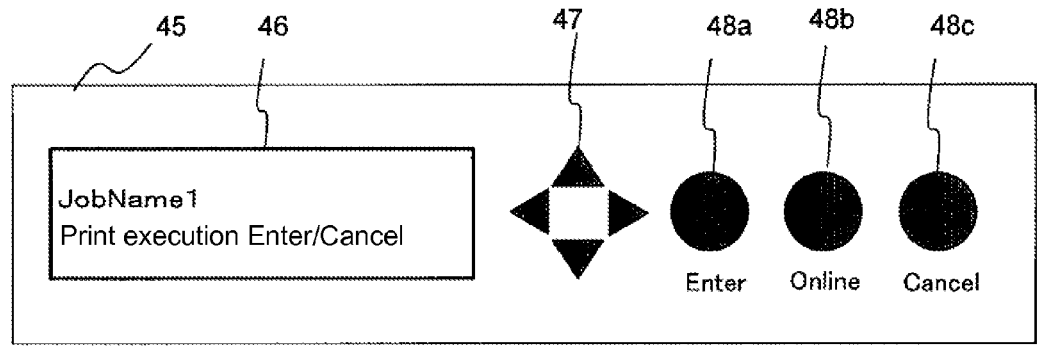
FIG. 6 is a schematic view showing an operation panel of the image forming apparatus according to the first embodiment of the present invention.

FIG. 6 is a schematic view showing the operation panel 45 of the image forming apparatus 10 according to the first embodiment of the present invention.

As shown in FIG. 6, the operation panel 45 includes an operation panel display portion 46; a vertical and horizontal button 47; an enter button 48a; an online button 48b; and a cancel button 48c. The operation panel display portion 46 is provided for displaying a character, a drawing, and an image. The enter button 48a, the online button 48b, and the cancel button 48c constitute an operation portion for receiving an instruction of the operator of the image forming apparatus 10.

Figure 7:
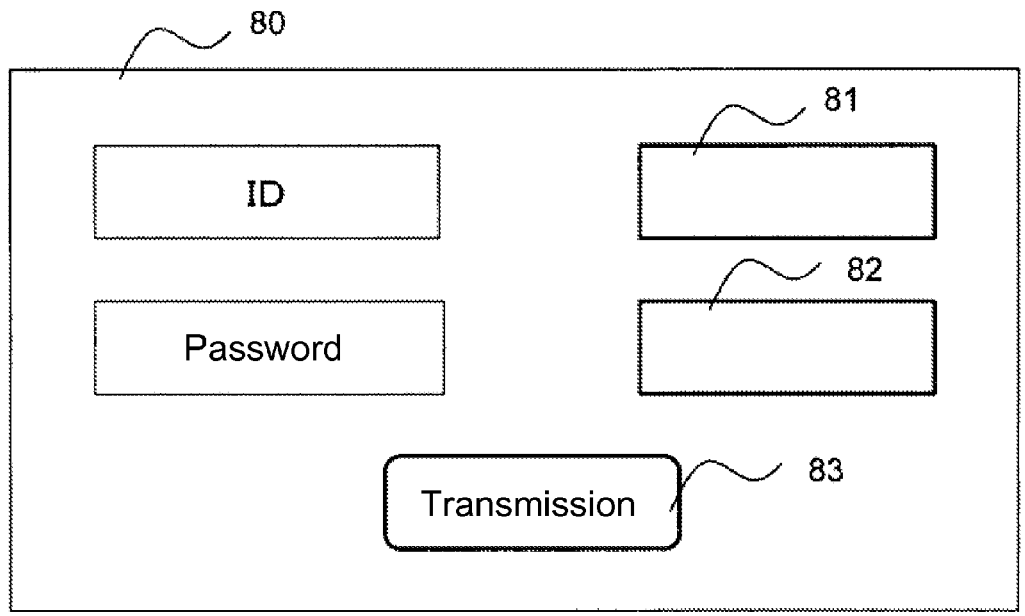
FIG. 7 is a schematic view showing an initial screen of a web server unit of the image forming apparatus according to the first embodiment of the present invention.

FIG. 7 is a schematic view showing an initial screen 80 of the web server unit 51 of the image forming apparatus 10 according to the first embodiment of the present invention.

As shown in FIG. 7, the initial screen 80 includes a character string "ID"; an ID input field 81 arranged on the right side of the character string "ID"; a character string "Password" arranged below the character string "ID"; a password input field 82 arranged on the right side of the character string "Password"; and a transmission button 83 arranged below the character string "Password".

FIG. 8 is a schematic view showing an authentication print data list screen 90 of the web server unit 51 of the image forming apparatus 10 according to the first embodiment of the present invention.

As shown in FIG. 8, the authentication print data list screen 90 is provided for displaying a list of the information of the authentication print data 300A obtained from the print data administration table 400. It is noted that when the operator logs in to obtain the administrative authority of the authentication print data 300A, the operator can select the information of the authentication print data 300A. A manual is displayed below the information of the authentication print data 300A, so that the administrative authority of the authentication print data 300A is transferred.

In the embodiment, the authentication print data list screen 90 includes a combination box 93 and an input field 94 arranged below the manual. When the operator clicks a triangular portion displayed on the right side of the combination box 93, the list of the individual identification information, to which the administrative authority has been transferred before, is displayed in a pull down format, so that the individual identification information can be selected.

In the embodiment, the input field 94 is provided for inputting the individual identification information, to which the administrative authority is transferred. An authority transfer execution button 95 is arranged below the input field 94.

An operation of the image forming apparatus 10 will be explained next with reference to FIG. 1. First, the authentication print data reception unit 31 receives the print data through the network 70. Then, the print data thus received is transmitted to the authentication print data analysis unit 32.

In the next step, referring to the authentication print mode specifying information 301 of the print data, the authentication print data analysis unit 32 determines whether the print data is the normal print data or the authentication print data 300A. When the authentication print data analysis unit 32 determines that the print data is the normal print data, the print data thus received is transmitted to the printing unit 35, so that the printing unit 35 starts the printing operation. When the authentication print data analysis unit 32 determines that the print data is the authentication print data 300A, the authentication print data 300A thus received is transmitted to the authentication print data storage unit 33.

In the next step, the authentication print data storage unit 33 generates the print data file 300B having a unique file name within the image forming apparatus 10, so that the authentication print data storage unit 33 stores the authentication print data 300A. Further, the authentication print data storage unit 33 extracts the job name 302, the printing person identification information 303, the print data generation date and time 304, and the print data generation computer name 305 from the authentication print data 300A. Then, the authentication print data storage unit 33 transmits the job name 302, the printing person identification information 303, the print data generation date and time 304, and the print data generation computer name 305 together with the file name of the print data file 300B thus stored to the authentication print data administration unit 34. Accordingly, the authentication print data administration unit 34 additionally stores the records related to the information thus transmitted to the print data administration table 400.

An entire operation of an authentication print system will be explained next with reference to FIG. 2. First, after the computer 100 generates the authentication print data 300A, the authentication print data 300A is transmitted to the image forming apparatus 10 through the network 70.

In the next step, after the authentication print data 300A thus transmitted is authenticated using the RFID card, the image forming apparatus 10 performs the printing operation of the authentication print data 300A. In the embodiment, the computer 100 functions as the web server, to which the computers 100 (=100-1 to 100-3) can access, so that the administrative authority of the authentication print data 300A can be transferred.

In the embodiment, when the administrative authority of the authentication print data 300A is transferred, the information of the authority transferred person and the print data creating person is obtained from the LDAP server 200, and the first mail is transmitted to the SMTP server 201. After the administrative authority of the authentication print data 300A is transferred, when the authentication print data 300A is printed, the second mail is transmitted to the SMTP server 201.

An operation of the software in the computer 100 will be explained next with reference to FIG. 3. When the print application 150 of the computer 100 detects the print instruction from the user, the print application 150 generates the print data with the print data generation unit 143 according to the setting of the authentication print instruction unit 141 of the driver 140. Further, the print application 150 transmits the print data to the image forming apparatus 10 that is specified in advance when the driver 140 is installed.

In the next step, when the authentication print instruction unit 141 specifies the authentication print, the identification information generation unit 142 generates the identification information for specifying an individual, and the identification information is transmitted to the print data generation unit 143. When the print data generation unit 143 receives the identification information, the print data generation unit 143 generates the authentication print data 300A with the individual identification information of the print data creating person attached thereto. The individual identification information may vary depending on an administration procedure, and may include, for example, an login ID, an authentication ID set in advance, an employee number, and a mail address.

An operation of performing the authentication print will be explained next with reference to FIGS. 1 and 5. When the operator performs the authentication print, the operator moves the RFID card over the IC card reader 40 shown in FIG. 1. When the RFID card information reading unit 42 detects that the RFID card moves over the IC card reader 40, the RFID card information reading unit 42 obtains the individual identification information from the RFID card through the USB interface communication unit 41, and transmits the individual identification information to the authentication print authentication unit 43.

In the next step, the authentication print authentication unit 43 determines whether there is the record in the print data administration table 400, in which the individual identification information thus obtained matches to the print data administrator identification information 404, and the IC card reader 401 indicates the print data file 300B with the status "Waiting Authentication State". When the authentication print authentication unit 43 determines that there is the record, the operation panel control unit 44 displays a confirmation message.

An operation of the image forming apparatus 10 when the image forming apparatus 10 receives the authentication print data 300A will be explained next with reference to FIG. 6. First, as described above, the operation panel display portion 46 displays the job name 402 with the information matched. When the operation panel control unit 44 detects that the enter button 48a indicating the print execution is pushed within a specific period of time since the operation panel display portion 46 displays the job name 402, the operation panel control unit 44 notifies the authentication print data administration unit 34. When the operation panel control unit 44 detects that the cancel button 48c is pushed, or does not detect that the enter button 48a or the cancel button 48a is pushed within the specific period of time since the operation panel display portion 46 displays the job name 402, the image forming apparatus 10 does not perform any operation and returns to the state before the RFID card moves over the IC card reader 40.

In the next step, when the authentication print data administration unit 34 receives the notification of the printing operation from the operation panel display portion 46, the authentication print data administration unit 34 updates the IC card reader 401 from "Waiting Authentication State" to "In Printing State" in the print data administration table 400 shown in FIG. 5. Further, the authentication print data administration unit 34 transmits the print data file 300B with the authentication print data 300A stored therein to the printing unit 35.

In the next step, the printing unit 35 prints the authentication print data 300A thus transmitted on the recording medium. After the printing unit 35 prints the authentication print data 300A on the recording medium, the printing unit 35 transmits a notice that the printing operation is completed and after print information obtained through the printing operation to the authentication print data administration unit 34. The after print information may include, for example, a print start date and time, a print execution sheet number, and a print sheet size.

In the next step, the authentication print data administration unit 34 transmits the administration information administered with the print data administration table 400 of the authentication print data 300A thus printed and the after print information transmitted from the printing unit 35 to the log recording unit 61 and the print completion mail transmission unit 36, respectively.

After the authentication print data administration unit 34 transmits the administration information and the after print information, the authentication print data administration unit 34 deletes the record, in which the information of the authentication print data 300A is stored, from the print data administration table 400. Further, the authentication print data administration unit 34 deletes the print data file 300B with the authentication print data 300A stored therein. In the next step, the log recording unit 61 stores the information received from the authentication print data administration unit 34 to the log file 500. It is noted that the print completion mail transmission unit 36 does not perform any operation after the authentication print data 300A, whose administrative authority is not transferred, is completely printed. Through the process described above, the operator can obtain the print result printed on the recording medium.

An operation of transferring the administrative authority will be explained next. In "Waiting Authentication State", in which the authentication print data 300A is stored in the image forming apparatus 10, the operator may want to transfer the authority of printing the authentication print data 300A to somebody else. For example, after the operator uses the print application 150 to perform the authentication printing, the operator may request a subordinate or a secretary to print on the recording medium. This is because it may take time to print on the recording medium.

First, the operator uses the web browser 130 of the computer 100 to access to the web server unit 51 of the image forming apparatus 10 where the authentication print data 300A is stored. As a result, the web server unit 51 displays the initial screen 80 as the login authentication screen.

An operation of the initial careen of the web server unit 51 will be explained with reference to FIG. 7. After the ID and the password are input in the ID input field 81 and the password input field 82, when the operator clicks the transmission button 83, the ID input in the ID input field 81 and the password input in the password input field 82 are transmitted to the login authentication unit 52 shown in FIG. 3.

In the next step, the login authentication unit 52 requests the LDAP server 200 to authenticate the ID and the password thus transmitted. When the LDAP server 200 transmits an approval response, the login authentication unit 52 obtains the individual identification information corresponding to the ID and the password from the LDAP server 200, and transmits the individual identification information to the authentication print data display unit 53.

In the next step, referring to the print data administration table 400, the authentication print data display unit 53 obtains the information of the authentication print data 300A, in which the individual identification information is equal to the print data administrator identification information 404, and the IC card reader 401 is "Waiting Authentication Status". Further, from the administrative authority transfer history table 600, in which the individual identification information of the person whom the print data creating person has transferred the administrative authority before is stored, the authentication print data display unit 53 obtains the individual identification information of the person whom the print data creating person has transferred the administrative authority before, so that the authentication print data display unit 53 generates and transmits the authentication print data list screen 900.

An operation of the authentication print data list screen 900 will be explained with reference to FIG. 8. When the operator clicks the authority transfer execution button 95, the information of the authentication print data 300A selected in a check box 92 and the individual identification information are transmitted to the authority transfer execution unit 54 through the web server unit 51 of the image forming apparatus 10. As described above, the individual identification information to which the administrative authority has been transferred before is selected in the combination box 93, and the individual identification information to which the administrative authority is transferred is input through the input field 94.

Figure 9:
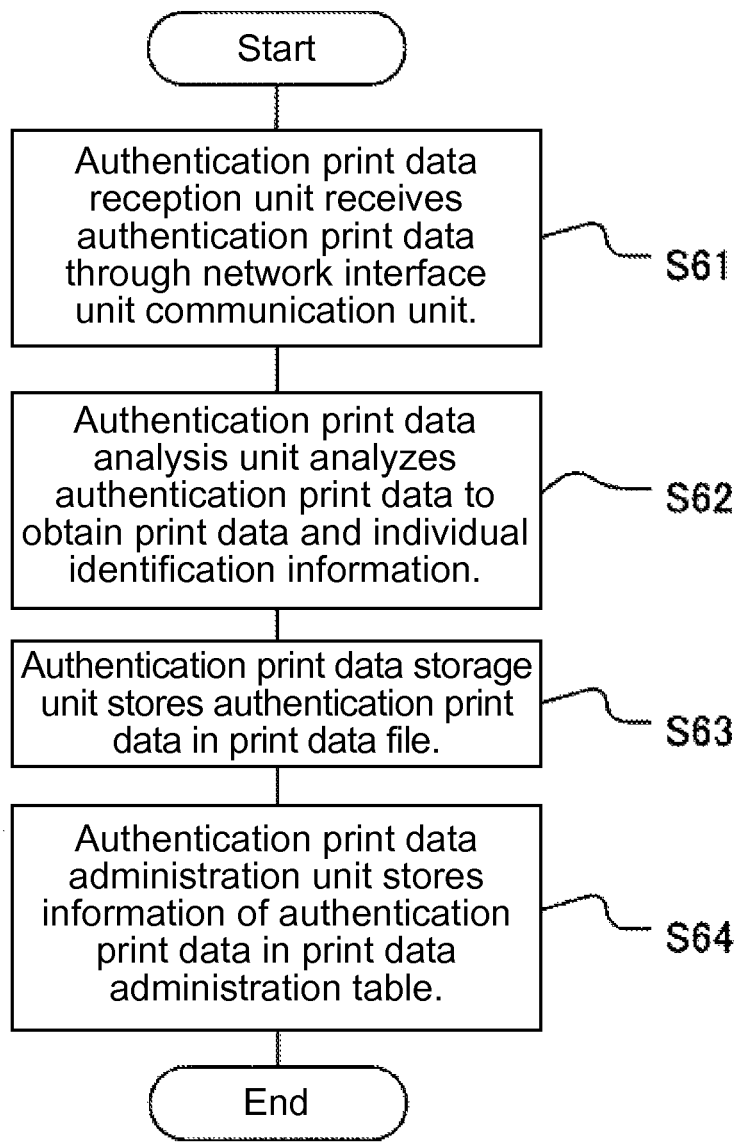
FIG. 9 is a flow chart showing an operation of the image forming apparatus for receiving the authentication print data according to the first embodiment of the present invention.

An operation of the image forming apparatus 10 for receiving the authentication print data will be explained next with reference to FIG. 9. FIG. 9 is a flow chart showing the operation of the image forming apparatus 10 for receiving the authentication print data according to the first embodiment of the present invention.

In step S61, the authentication print data reception unit 31 receives the authentication print data 300A through the network interface unit communication unit 20. In step S62, the authentication print data analysis unit 32 analyzes the authentication print data 300A to obtain the print data and the individual identification information.

In step S63, the authentication print data storage unit 33 stores the authentication print data 300A in the print data file 300B. IN step S64, the authentication print data administration unit 34 stores the information of the authentication print data 300A in the print data administration table 400, thereby completing the process shown in FIG. 9.

Figure 10:
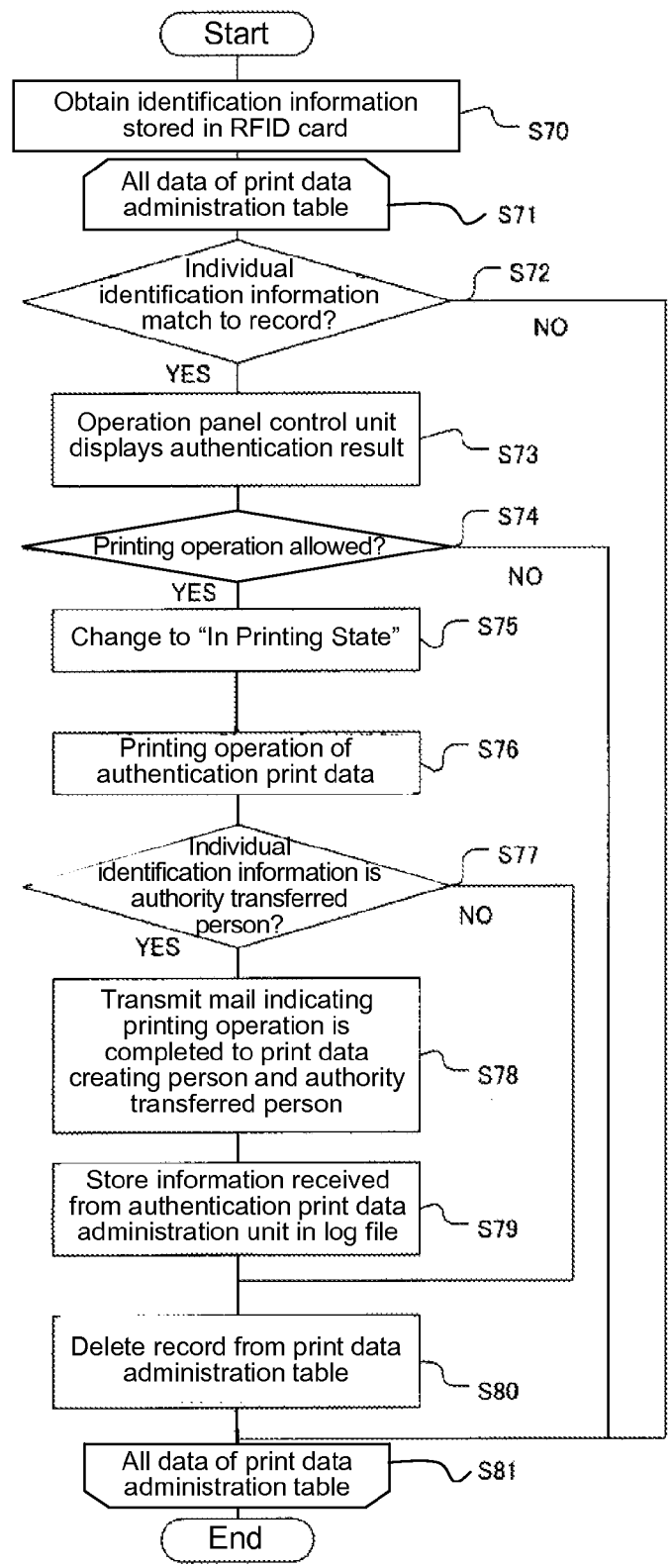
FIG. 10 is a flow chart showing a printing operation of the image forming apparatus according to the first embodiment of the present invention.

The printing operation of the image forming apparatus 10 will be explained next with reference to FIG. 10. FIG. 10 is a flow chart showing the printing operation of the image forming apparatus 10 according to the first embodiment of the present invention.

In step S70, the RFID card information reading unit 42 obtains the identification information stored in the RFID card. In step S71, the image forming apparatus 10 repeats the process for all data of the print data administration table 400. In step S72, the authentication print authentication unit 43 determines whether the individual identification information of the RFID card matches to the record.

In step S73, the operation panel control unit 44 displays the authentication result on the operation panel display portion 46. In step S74, it is determined whether the enter button 48*a* is pushed within the specific period of time, indicating that the printing operation is allowed to be performed. When it is determined that the enter button 48*a* is pushed within the specific period of time, the process proceeds to step S75. When it is determined that the enter button 48*a* is not pushed or the cancel button 48*c* is pushed within the specific period of time, the process proceeds to step S81.

In step S75, the printing unit 35 changes the IC card reader 401 of the record to "In Printing State". In step S76, the printing unit 35 performs the printing operation of the authentication print data 300A.

In step S77, it is determined whether the individual identification information of the RFID card is the authority transferred person. When it is determined that the individual identification information of the RFID card is the authority transferred person, the process proceeds to step S78. When it is determined that the individual identification information of the RFID card is not the authority transferred person, the process proceeds to step S80.

In step S78, the print completion mail transmission unit 36 transmits the mail indicating that the printing operation is completed to the print data creating person mail address 408 and the print data administrator mail address 409 as the authority transferred person. In step S79, the log recording unit 61 stores the information received from the authentication print data administration unit 34 in the log file 500.

In step S80, the authentication print data administration unit 34 deletes the record from the print data administration table 400. In step S81, the authentication print data administration unit 34 repeats the process for all records of the print data administration table 400, thereby completing the process shown in FIG. 10.

Figure 11:
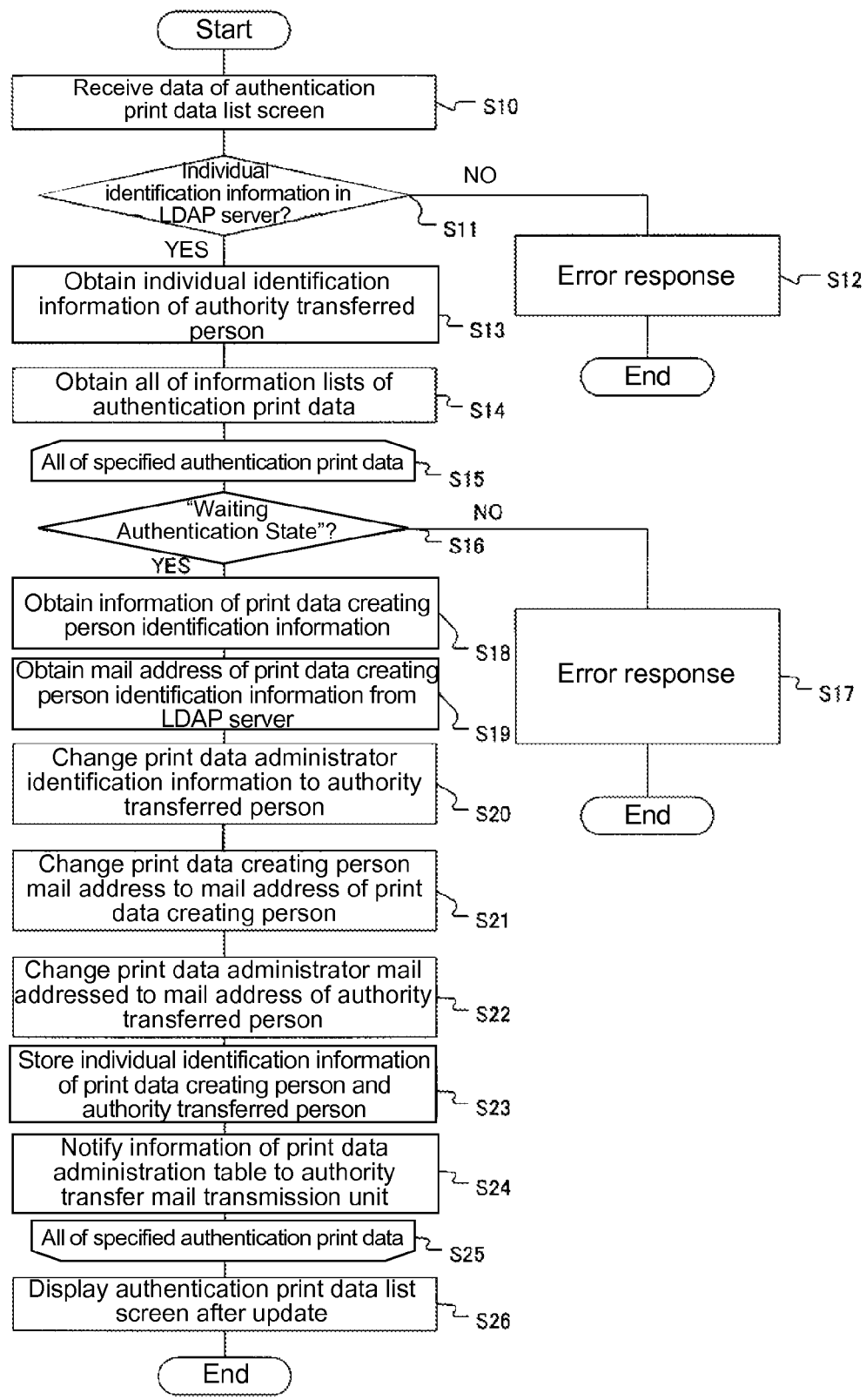
FIG. 11 is a flow chart showing an operation of the image forming apparatus for transferring administrative authority according to the first embodiment of the present invention.

An operation of the image forming apparatus 10 for transferring the administrative authority will be explained next with reference to FIG. 11. FIG. 11 is a flow chart showing the operation of the image forming apparatus 10 for transferring the administrative authority according to the first embodiment of the present invention.

In step S10, when the operation starts, the image forming apparatus 10 receives the data of the authentication print data list screen 90 to obtain the information of the authentication print data 300A specified in the check box 92. Further, the image forming apparatus 10 obtains the individual identification information of the authority transferred person, to whom the administrative authority of the authentication print data 300A is to be transferred, specified in the combination box 93 or the input field 94.

In step S11, it is determined whether the individual identification information of the authority transferred person is registered in the LDAP server 200. When it is determined that the individual identification information of the authority transferred person is not registered in the LDAP server 200, it is considered as an input mistake, and the process proceeds to step S12.

In step S12, the error response is transmitted. The error message may be "No specified user registered". When it is determined that the individual identification information of the authority transferred person is registered in the LDAP server 200, the process proceeds to step S13.

In step S13, the image forming apparatus 10 obtains the individual identification information of the authority transferred person from the LDAP server 200. The individual identification information includes the mail address of the authority transferred person. In step S14, all of the information lists of the authentication print data 300A thus specified is obtained.

In step S15, the process is repeated until all of the authentication print data 300A thus specified is processed. In step S16, it is determined whether the IC card reader 401 related to the authentication print data 300A is "Waiting Authentication State". When it is determined that the IC card reader 401 related to the authentication print data 300A is not "Waiting Authentication State", the process proceeds to step S17.

In step S17, the error response is transmitted. The error message may be "the authentication print data 300A is already printed or the administrative authority of the authentication print data 300A is already transferred". When it is determined that the IC card reader 401 related to the authentication print data 300A is "Waiting Authentication State", the process proceeds to step S18.

In step S18, the image forming apparatus 10 obtains the information of the print data creating person identification information 403 of the authentication print data 300A from the print data administration table 400. In step S19, the image forming apparatus 10 obtains the mail address of the print data creating person identification information 403 from the LDAP server 200 according to the information of the print data creating person identification information 403.

In step S20, the image forming apparatus 10 changes the print data administrator identification information 404 of the record to the individual identification information of the authority transferred person.

In step S21, the image forming apparatus 10 changes the print data creating person mail address 408 of the record to the mail address of the print data creating person obtained from the LDAP server 200.

In step S22, the image forming apparatus 10 changes the print data administrator mail address 409 of the record to the mail address of the authority transferred person obtained from the LDAP server 200.

In step S23, the image forming apparatus 10 stores the individual identification information of the print data creating person identification information 403 obtained from the LDAP server 200 and the individual identification information of the authority transferred person obtained from the LDAP server 200 to the administrative authority transfer history table 600. Accordingly, when administrative authority is transferred next time, it is possible to easily input the individual identification information.

In step S24, the image forming apparatus 10 notifies the information of the print data administration table 400 to the authority transfer mail transmission unit 55. When the authority transfer mail transmission unit 55 receives the notification, the authority transfer mail transmission unit 55 generates an electric mail as the first mail, and transmits the first mail to the SMTP server 201. In the first mail, the print data creating person mail address 408 and the print data administrator mail address 409 are included in destinations "Bcc:" thereof, and the information of the authentication print data 300A notified from the authority transfer execution unit 54 is converted in a specific format. As a result, any person having the print data administrator mail address 409 can access to the SMTP server 201 to receive the first mail.

In step S25, the process returns to step S15 until all of the authentication print data 300A thus specified is processed. In step S26, the authentication print data display unit 53 displays the authentication print data list screen 90 after the update, thereby completing the operation shown in FIG. 11.

In the operation shown in FIG. 11, the information of the authentication print data 300A is notified through the electric mail as the first mail to the person who creates the authentication print data 300A and the person to whom the administrative authority of the authentication print data 300A is transferred. The first mail is transmitted so that the person to whom the administrative authority of the authentication print data 300A is transferred is notified of the fact. Further, when the administrative authority of the authentication print data 300A is transferred to the third party from the person to whom the administrative authority of the authentication print data 300A is transferred, the person who creates the authentication print data 300A can confirmed that the administrative authority of the authentication print data 300A is transferred.

Figure 12A:
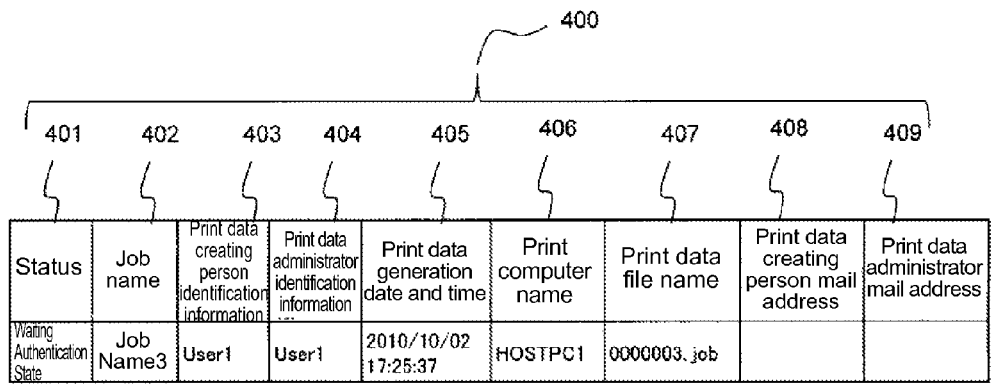
FIG. 12(a) is a schematic view showing the print data administration table before the administrative authority is transferred according to the first embodiment of the present invention.
Figure 12B:
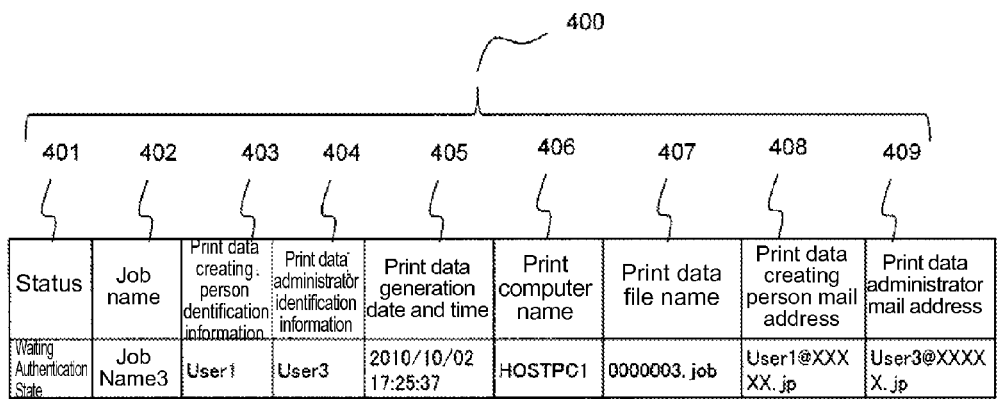
FIG. 12(b) is a schematic view showing the print data administration table after the administrative authority is transferred according to the first embodiment of the present invention.

FIG. 12(a) is a schematic view showing the print data administration table 400 before the administrative authority is transferred according to the first embodiment of the present invention. FIG. 12(b) is a schematic view showing the print data administration table 400 after the administrative authority is transferred according to the first embodiment of the present invention.

As shown in FIG. 12(a), the print data administration table 400 includes the record representing the authentication print data 300A in which the job name 402 is "JobName3". The person who creates the print data is "User1". It is supposed that according to the instruction of the person "User1", the administrative authority of the authentication print data 300A is transferred to a person "User3".

FIG. 12(b) is the schematic view showing the record of the print data administration table 400 after the administrative authority is transferred. As shown in FIG. 12(b), after the administrative authority is transferred, the record related to the authentication print data 300A is changed.

More specifically, the print data administrator identification information 404 of the record is changed to the individual identification information of the authority transferred person. Further, the print data creating person mail address 408 of the record is changed to the mail address of the print data creating person identification information 403 obtained from the LDAP server 200. Further, the print data administrator mail address 409 of the record is changed to the mail address of the authority transferred person obtained from the LDAP server 200.

In the embodiment, after the print data administration table 400 is updated, when the RFID card having the individual identification information of the authority transferred person is moved over the IC card reader 40, the authentication printing is performed. After the authentication printing is performed, the information of the authority transferred person is recorded in the log file 500 as the person who performs the authentication printing.

Accordingly, both of the individual identification information of the print data creating person and the individual identification information of the person who performs the authentication printing are recorded in the log file 500. As a result, if a security accident happens, it is possible to identify both the print data creating person and the person who performs the authentication printing through a tracking investigation.

In the embodiment, after the administrative authority is transferred, in the record, the mail addresses are stored in the print data creating person mail address 408 and the print data administrator mail address 409, respectively. Accordingly, it is possible to determine whether the administrative authority is transferred.

In the embodiment, when the authentication print data 300A with the administrative authority thereof transferred is printed, the print completion mail transmission unit 36 transmits an electric mail as the second mail to the SMTP server 201. In the second mail, the print data creating person mail address 408 and the print data administrator mail address 409 are included in the destinations "Bcc:" thereof. The information of the authentication print data 300A after the authentication printing is performed and the after print information are converted in a specific format to create a main text of the second mail.

In the embodiment, when the administrative authority is not transferred, in the record, nothing is stored in the print data creating person mail address 408 or the print data administrator mail address 409. Accordingly, the print completion mail transmission unit 36 does perform nothing.

As described above, the image forming apparatus 10 includes the web server unit 51. When the operator operates the web browser 130 of the computer 100, it is possible to transfer the administrative authority of the authentication print data 300A. In other words, the operator can perform the printing operation of the application and the transfer operation of the administrative authority after the printing operation using the same computer 100. Accordingly, the operator does not need to leave from the computer 100, thereby improving operation efficiency.

In the embodiment, in the image forming apparatus 10, when the administrative authority of the authentication print data 300A is transferred, the operator operates the web browser 130 to display the authentication print data 300A stored therein and input the individual identification information of the person to whom the administrative authority is transferred. Accordingly, even when the image forming apparatus 10 is provided with the operation panel display portion 46 having a small size and a small input unit with only a few buttons for inputting the information, it is possible to efficiently input the information.

FIG. 13 is a schematic view showing the first mail to be transmitted from the image forming apparatus 10 when the administrative authority is transferred according to the first embodiment of the present invention.

As shown in FIG. 13, "Printer" is displayed in "From:" indicating the origination address of the first mail.

Nothing is displayed in "To:" indicating the destination address of the first mail, and "Cc:" indicating the destination address of the copy. In "Bcc:" indicating the non-displayed destination address of the copy, "User1_Print data creating person<User1@XXXX.jp>" and "User3_Administrative authority transferred person<User3@XXXX.jp>" are displayed. "Administrative authority transfer notification of authentication print" is displayed in "Title:" indicating the subject of the first mail.

Further, the main text of the first mail includes "This mail is sent from Printer. The administrative authority of the following authentication print is transferred from User1 to User3 Date: 2010/10/02 17:25:37 Apparatus: Printer Document: AuthDocument.text".

FIG. 14 is a schematic view showing the second mail to be transmitted from the image forming apparatus 10 when the printing operation is completed according to the first embodiment of the present invention.

As shown in FIG. 14, "Printer" is displayed in "From:" indicating the origination address of the second mail. Nothing is displayed in "To:" indicating the destination address of the second mail, and "Cc:" indicating the destination address of the copy. In "Bcc:" indicating the non-displayed destination address of the copy, "User1_Print data creating person<User1@XXXX.jp>" and "User3_Administrative authority transferred person<User3@XXXX.jp>" are displayed. "Completion notification of authentication print" is displayed in "Title:" indicating the subject of the second mail.

Further, the main text of the second mail includes "This mail is sent from Printer. The authentication print data with the administrative authority thereof transferred from User1 to User 3 is completed Date: 2010/11/02 11:01:00 Apparatus: Printer (XXX.XXX.XXX.XXX) Printing person: User3 Document: AuthDocument.text Printed sheet number: 50".

In the embodiment, with the image forming apparatus 10 and the method of transferring the administrative authority of the authentication print data 300A, it is possible to obtain the following effects. First, after the operation of the authentication print is performed on the computer 100, it is possible to safely transfer the administrative authority of the authentication print data 300A to the specific user.

Second, the image forming apparatus 10 includes the web server unit 51. When the web browser 130 is operated through the computer 100, it is possible to transfer the administrative authority of the authentication print data 300A. Accordingly, it is possible to perform the printing operation of the application and the transfer operation of the administrative authority after the printing operation using the same computer 100. Accordingly, the operator does not need to leave from the computer 100, thereby improving operation efficiency.

Third, the image forming apparatus 10 includes the web server unit 51. When the administrative authority of the authentication print data 300A is transferred, the web browser 130 of the computer 100 is used for displaying the authentication print data 300A stored therein and inputting the individual identification information of the administrative authority transferred person. Accordingly, even when the image forming apparatus 10 is provided with the operation panel display portion 46 having a small size and a small input unit with only a few buttons for inputting the information, it is possible to efficiently input the information.

Second Embodiment

A second embodiment of the present invention will be explained next. In the second embodiment, the image forming apparatus 10 has a configuration similar to that of the image forming apparatus 10 in the first embodiment shown in FIG. 1. In the second embodiment, the computer 100 has a configuration similar to that of the computer 100 in the first embodiment shown in FIG. 3. In the second embodiment, the authentication print data 300A has a format similar to that of the authentication print data 300A in the first embodiment shown in FIG. 4.

FIG. 15 is a schematic view showing an example of a print data administration table 400A according to the second embodiment of the present invention.

As shown in FIG. 15, in addition to the configurations of the print data administration table 400 in the first embodiment, the print data administration table 400A includes a print data deletion process flag 410.

FIG. 16 is a schematic view showing an authentication print data list screen 90A of the web server unit 51 of the image forming apparatus 10 according to the second embodiment of the present invention.

As shown in FIG. 16, different from the authentication print data list screen 90 in the first embodiment, the authentication print data list screen 90A includes a plurality of combination boxes 93A (=93A-1 to 93A-5); a plurality of input fields 94A (=94A-1 to 94A-5); a radio button 96; and a radio button 97. Other configurations of the authentication print data list screen 90A are similar to those of the authentication print data list screen 90 in the first embodiment.

In the embodiment, when the operator clicks a triangular portion displayed on the right side of each of the combination boxes 93A (=93A-1 to 93A-5), a pull down menu is displayed. In the pull down menu, the list of the individual identification information is displayed. The operator selects the individual identification information, so that the operator can transfer the administrative authority. In the pull down menu, the individual identification information, to which the administrative authority has been transferred before, is displayed. In 90a, the combination boxes 93A (=93A-1 to 93A-5) are arranged at five locations in a vertical direction thereof, so that the operator can transfer the administrative authority to a plurality of individuals.

In the embodiment, the input fields 94A (=94A-1 to 94A-5) are provided for inputting the individual identification information of the user, to which the administrative authority is transferred. In 90a, the input fields 94A (=94A-1 to 94A-5) are arranged at five locations in the vertical direction thereof, so that the operator can transfer the administrative authority to a plurality of individuals.

In the embodiment, the combination boxes 93A (=93A-1 to 93A-5) and the input fields 94A (=94A-1 to 94A-5) are arranged at the five locations in the vertical direction of the authentication print data list screen 90A. Alternatively, the combination boxes 93A (=93A-1 to 93A-5) and the input fields 94A (=94A-1 to 94A-5) may be arranged at more than six locations or less than five locations.

In the embodiment, when the radio button 96 is selected, all records of the print data administration table 400A related to the authentication print data 300A and the print data file 300B related to the authentication print data 300A are deleted when one of the persons, to whom the administrative authority is transferred, completes the printing operation, indicating the deletion method information "delete when one of administrative authority transferred persons completes printing operation". In this case, the one of the persons, to whom the administrative authority is transferred, obtains the printing result, indicating the deletion method information "one of administrative authority transferred persons obtains printing result".

In the embodiment, when the radio button 97 is selected, the person who prints the authentication print data 300A deletes the records of the print data administration table 400A described in the print data administrator identification information 404 every time when the person, to whom the administrative authority is transferred, completes the printing operation, indicating the deletion method information "delete when all of administrative authority transferred persons complete printing operation". Then, when all records of the print data administration table 400A related to the authentication print data 300A are deleted, the print data file 300B is deleted. In this case, all of the persons, to whom the administrative authority is transferred, obtain the printing result, indicating the deletion method information "all of administrative authority transferred persons obtain printing result".

In the embodiment, when the operator clicks the authority transfer execution button 95, the information of the authentication print data 300A selected in the check box 92 and the individual identification information of the administrative authority transferred persons, to whom the administrative authority has been transferred before, are transmitted to the authority transfer execution unit 54 through the web server unit 51 of the image forming apparatus 10. As described above, the individual identification information of the administrative authority transferred persons is selected through the combination boxes 93A (=93A-1 to 93A-5).

Further, the individual identification information of the persons, to whom the administrative authority is transferred, selected through the input fields 94A (=94A-1 to 94A-5) is transmitted to the authority transfer execution unit 54 through the web server unit 51 of the image forming apparatus 10. Further, the information regarding which of the radio button 96 and the radio button 97 is selected as the deletion method of the print data is transmitted to the authority transfer execution unit 54 through the web server unit 51 of the image forming apparatus 10.

An operation of the image forming apparatus 10 for transferring the administrative authority to a plurality of administrative authority transferred persons will be explained next.

First, similar to the first embodiment, the print data creating person operates the print application 150 of the computer 100 to perform the printing operation. Then, the driver 140 generates the authentication print data 300A shown in FIG. 4 according to the specification of the authentication print instruction unit 141. Then, the communication unit 120 transmits the authentication print data 300A thus generated to the image forming apparatus 10.

In the next step, similar to the first embodiment, when the image forming apparatus 10 receives the authentication print data 300A, the image forming apparatus 10 transmits the authentication print data 300A to the authentication print data administration unit 34 through the authentication print data reception unit 31, the authentication print data analysis unit 32, and the authentication print data storage unit 33.

In the next step, the authentication print data administration unit 34 generates a new record in the print data administration table 400, and records the job name 302, the printing person identification information 303, the print data generation date and time 304, the print data generation computer name 305, and the print data file 300B of the authentication print data 300A thus received in the new record.

In the next step, similar to the first embodiment, the authentication print data administration unit 34 stores "Waiting Authorization State" in the IC card reader 401. Further, the authentication print data administration unit 34 stores the job name related to the authentication print data 300A in the job name 302, and stores the printing person identification information 303 in the print data creating person identification information 403. Further, the authentication print data administration unit 34 stores the printing person identification information 303 in the print data administrator identification information 404, and stores the print data generation date and time 304 in the print data generation date and time 405. Further, the authentication print data administration unit 34 stores the print data generation computer name 305 in the print computer name 406, and stores the file name under which the authentication print data 300A is stored in the print data file name 407. It is noted that the authentication print data administration unit 34 stores nothing in the print data creating person mail address 408 and the print data administrator mail address 409.

In the embodiment, the print data is deleted from the print data administration table 400 after the printing operation is completed. When only the record is deleted, "0" is stored in the print data deletion process flag 410. When all records having the print data file name 407 are deleted, "1" is stored in the print data deletion process flag 410. It is noted that the initial value of the IC card reader 401 is "0" when the record is generated.

In the second embodiment, similar to the first embodiment, when the print data creating person performs the printing operation, the RFID card moves over the IC card reader 40 for the authentication. After the printing operation is completed, the authentication print data administration unit 34 determines the value of the print data deletion process flag 410 with reference to the record, whose printing operation is completed, from the print data administration table 400.

In the embodiment, when the authentication print data administration unit 34 determines that "0" is stored in the print data deletion process flag 410, only the record is deleted. When there is no other records having the print data file name 407 the same as that stored in the print data file name 407 of the record thus deleted, the authentication print data administration unit 34 deletes the print data file 300B.

In the embodiment, when the authentication print data administration unit 34 determines that "1" is stored in the print data deletion process flag 410, the authentication print data administration unit 34 obtains the print data file name 407 of the record. Then, the authentication print data administration unit 34 deletes all records having the print data file name 407 with the same contents of the print data file name 407 of the record thus obtained. Further, the authentication print data administration unit 34 deletes the print data file 300B.

In the second embodiment, similar to the first embodiment, the log recording unit 61 stores the information received from the authentication print data administration unit 34 in the log file 500. Further, the authentication print data administration unit 34 transmits the information retracted in the memory to the print completion mail transmission unit 36.

In the embodiment, the print completion mail transmission unit 36 generates the print completion mail as the second mail from the administration information of the authentication print data 300A. Then, the print completion mail transmission unit 36 transmits the print completion mail to the print data creating person mail address 408 and the print data administrator mail address 409 through the SMTP server 201. It is noted that when nothing is stored in the print data creating person mail address 408 and the print data administrator mail address 409, it is indicated that the administrative authority is not transferred. In this case, the print completion mail transmission unit 36 performs nothing.

An operation of transferring the administrative authority will be explained next. As described above, in the first embodiment, the print data creating person specifies one administrative authority transferred person, and transfers the administrative authority. Alternatively, the print data creating person may want to transfer the administrative authority to a plurality of persons, and further wants any one of the persons to whom the administrative authority is transferred to obtain the printing result. For example, the print data creating person may want to transfer the administrative authority to a plurality of subordinates, and later instruct one of the subordinates to perform the printing operation.

Alternatively, the print data creating person may want to transfer the administrative authority to a plurality of persons, and further wants all of the persons to whom the administrative authority is transferred to obtain the printing result. For example, the print data creating person may instruct all of participants of a meeting to perform the printing operation of a confidential document to be used in the meeting.

In the second embodiment, similar to the first embodiment, the print data creating person operates the web browser 130 of the computer 100 to access to the web server unit 51 of the image forming apparatus 10, in which the authentication print data 300A is stored. Further, the print data creating person performs the login authentication through inputting in the login authentication screen shown in FIG. 7.

Figure 17:
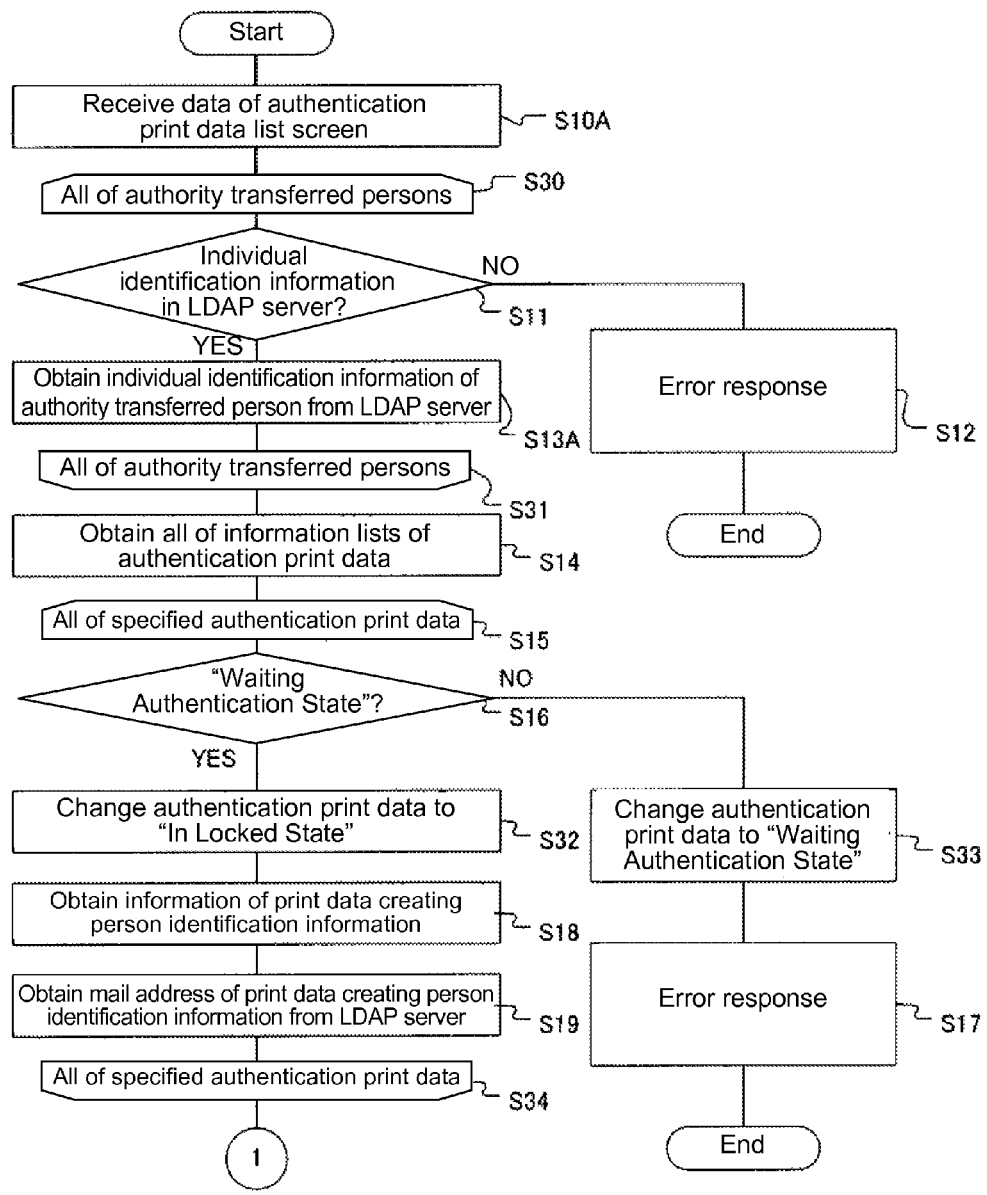
FIG. 17 is a flow chart No. 1 showing an operation of the image forming apparatus for transferring administrative authority according to the second embodiment of the present invention.

An operation of the image forming apparatus 10 for transferring the administrative authority will be explained next with reference to FIG. 17. FIG. 17 is a flow chart No. 1 showing the operation of the image forming apparatus 10 for transferring the administrative authority according to the second embodiment of the present invention. Components in FIG. 17 similar to those shown in FIG. 11 in the first embodiment are designated with the same reference numerals.

In step S10A, when the operation starts, the image forming apparatus 10 receives the information of the authentication print data list screen 90A. Further, the image forming apparatus 10 obtains the information of the authentication print data 300A specified in the check box 92. Further, the image forming apparatus 10 obtains the individual identification information of the authority transferred person, to whom the administrative authority of the authentication print data 300A is to be transferred, specified in the combination box 93 or the input field 94. Further, the image forming apparatus 10 obtains the information regarding which of the radio button 96 and the radio button 97 is selected as the authentication print data deletion method when the printing operation is completed.

In step S30, the process up to step S31 is repeated until all of the authority transferred persons to whom the administrative authority is transferred are processed.

In step S11, it is determined whether the individual identification information of the authority transferred person is registered in the LDAP server 200. When it is determined that the individual identification information of the authority transferred person is not registered in the LDAP server 200, it is considered as an input mistake, and the process proceeds to step S12.

In step S12, the error response is transmitted. The error message may be "No specified user registered". When it is determined that the individual identification information of the authority transferred person is registered in the LDAP server 200, the process proceeds to step S13A.

In step S13A, the image forming apparatus 10 obtains the individual identification information of the authority transferred person from the LDAP server 200. The individual identification information includes the mail address of the authority transferred person. The image forming apparatus 10 repeats the process from step S30 to step S31 for all of the authority transferred persons to whom the administrative authority is to be transferred.

In step S14, all of the information lists of the authentication print data 300A thus specified is obtained. In step S15, the image forming apparatus 10 repeats the process up to step S34 for all of the authentication print data 300A thus specified.

In step S16, it is determined whether the IC card reader 401 related to the authentication print data 300A is "Waiting Authentication State". When it is determined that the IC card reader 401 related to the authentication print data 300A is not "Waiting Authentication State", the process proceeds to step S33. In step S33, the IC card reader 401 of the authentication print data 300A is changed to "Waiting Authentication State".

In step S17, the error response is transmitted. The error message may be "the authentication print data 300A is already printed or the administrative authority of the authentication print data 300A is already transferred". When it is determined that the IC card reader 401 related to the authentication print data 300A is "Waiting Authentication State", the process proceeds to step S32. In step S32, the IC card reader 401 of the authentication print data 300A is changed to "In Locked State".

In the second embodiment, the process from step S18 to step S19 is similar to the process from step S18 to step S19 in the first embodiment. In step S34, the image forming apparatus 10 repeats the process from step S15 for all of the authentication print data 300A thus specified. Afterward, the process proceeds to the node 1 process shown in FIG. 18 (described later).

Figure 18:
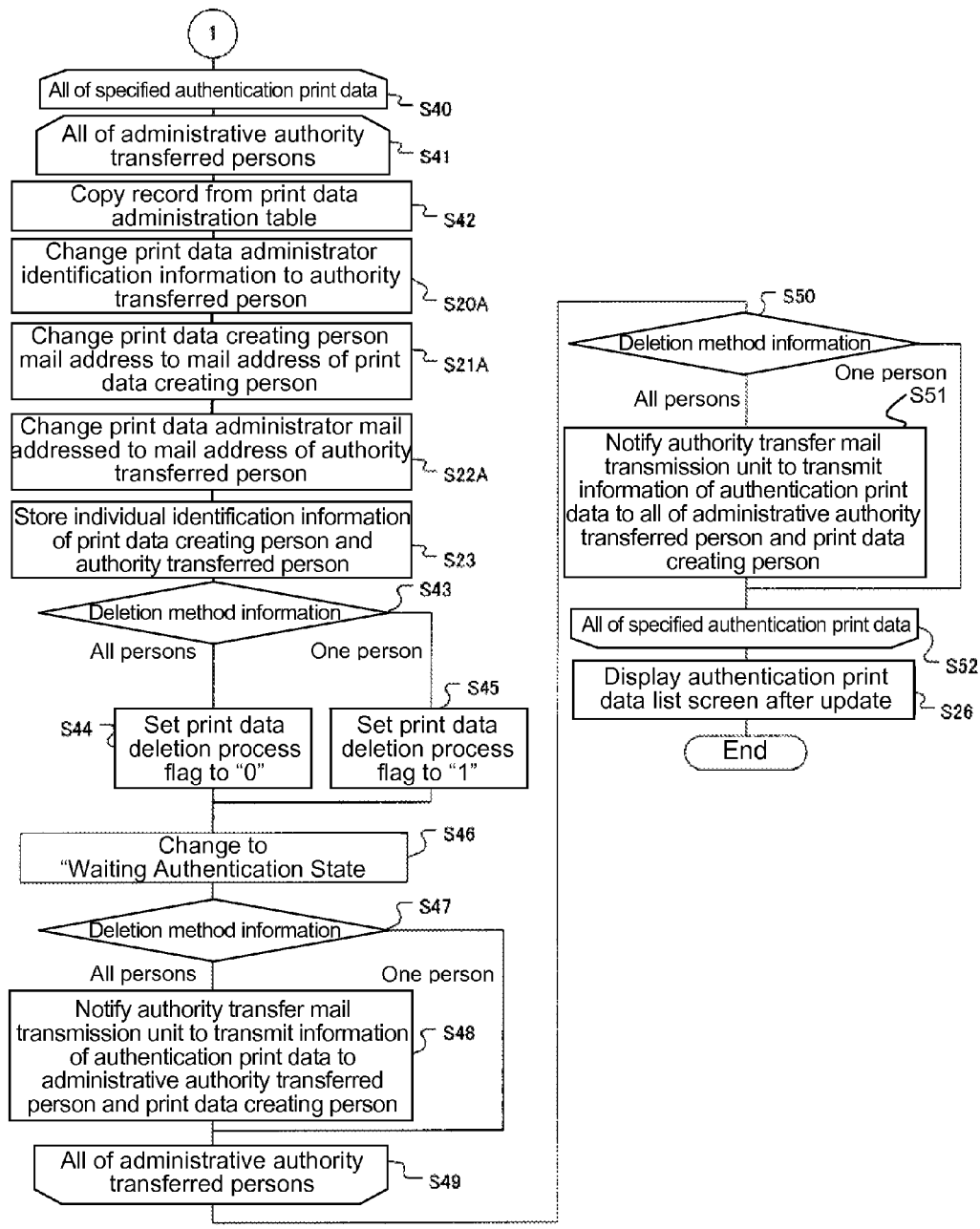
FIG. 18 is a flow chart No. 2 showing the operation of the image forming apparatus for transferring the administrative authority according to the second embodiment of the present invention.

FIG. 18 is a flow chart No. 2 showing the operation of the image forming apparatus 10 for transferring the administrative authority according to the second embodiment of the present invention. Components in FIG. 18 similar to those shown in FIG. 11 in the first embodiment are designated with the same reference numerals.

In step S40, when the node 1 process starts, the process up to step S51 is repeated for all of the authentication print data 300A. In step S41, the process up to step S49 is repeated for all of the administrative authority transferred persons.

In step S42, the image forming apparatus 10 copies the record from the print data administration table 400 on the memory. In step S20A, the image forming apparatus 10 changes the print data administrator identification information 404 of the record thus copied to the individual identification information of the administrative authority transferred person.

In step S21A, the image forming apparatus 10 changes the print data creating person mail address 408 of the record thus copied to the mail address of the print data creating person obtained from the LDAP server 200. In step S22A, the image forming apparatus 10 changes the print data administrator mail address 409 of the record thus copied to the mail address of the administrative authority transferred person obtained from the LDAP server 200.

In step S23, similar to the process in step S23 in the first embodiment, the image forming apparatus 10 stores the individual identification information of the print data creating person identification information 403 obtained from the LDAP server 200 and the individual identification information of the authority transferred person obtained from the LDAP server 200 to the administrative authority transfer history table 600.

In step S43, the image forming apparatus 10 determines the deletion method information of the authentication print data list screen 90A. When the image forming apparatus 10 determines that the radio button 97 is selected, indicating the deletion method information "delete when all of administrative authority transferred persons complete printing operation", the process proceeds to step S44. In step S44, the print data deletion process flag 410 of the record thus copied is set to "0". When the image forming apparatus 10 determines that the radio button 96 is selected, indicating the deletion method information "delete when one of administrative authority transferred persons complete printing operation", the process proceeds to step S45. In step S45, the print data deletion process flag 410 of the record thus copied is set to "1".

In step S46, the IC card reader 401 of the record thus copied is changed to "Waiting Authentication State".

In step S47, the image forming apparatus 10 determines the deletion method information of the authentication print data list screen 90A. When the image forming apparatus 10 confirms the deletion method information "delete when all of administrative authority transferred persons complete printing operation", the process proceeds to step S48.

In step S48, the authority transfer mail transmission unit 55 is notified so that the information of the authentication print data 300A is transmitted to the print data administrator as the administrative authority transferred person and the print data creating person. Accordingly, through the SMTP server 201, the authority transfer mail transmission unit 55 transmits the second mail having the main text obtained through forming the information of the authentication print data 300A in the specific format.

When the image forming apparatus 10 confirms the deletion method information "delete when one of administrative authority transferred persons complete printing operation", the process proceeds to step S49. In step S49, the image forming apparatus 10 repeats the process from step S41 for all of the administrative authority transferred persons.

In step S50, the image forming apparatus 10 determines the deletion method information of the authentication print data list screen 90A. When the image forming apparatus 10 confirms the deletion method information "delete when one of administrative authority transferred persons complete printing operation", the process proceeds to step S51.

In step S51, the authority transfer mail transmission unit 55 is notified so that the information of the authentication print data 300A is transmitted to all of the administrative authority transferred person and the print data creating person.

When the image forming apparatus 10 confirms the deletion method information "delete when all of administrative authority transferred persons complete printing operation", the process proceeds to step S52. In step S52, the image forming apparatus 10 repeats the process from step S40 for all of the authentication print data 300A thus specified.

In step S26, the authentication print data display unit 53 displays the authentication print data list screen 90 after the update, thereby completing the operation shown in FIG. 18.

FIG. 19(a) is a schematic view showing the print data administration table 400A before the administrative authority is transferred according to the second embodiment of the present invention. FIG. 19(b) is a schematic view showing the print data administration table 400A after the administrative authority is transferred according to the second embodiment of the present invention. Components in FIGS. 19(a) and 19(b) similar to those shown in FIGS. 12(a) and 12(b) in the first embodiment are designated with the same reference numerals.

As shown in FIG. 19(a), the print data administration table 400 includes one record, and the record has the job name 402 of "JobName3" and the print data creating person identification information 403 of "User1". It is supposed that according to the instruction of the person "User1", the administrative authority of the authentication print data 300A is transferred to the person "User2" and the person "User3".

FIG. 19(b) is the schematic view showing the print data administration table 400 after the administrative authority is transferred. As shown in FIG. 19(b), after the administrative authority is transferred, the record related to the authentication print data 300A is copied so that the number of the records is equal to the number of the administrative authority transferred persons.

More specifically, the print data administrator identification information 404 of the records is changed to the individual identification information of the administrative authority transferred persons of the person "User2" and the person "User3", respectively. Further, the print data creating person mail address 408 of the records is changed to the mail address of the print data creating person identification information 403 obtained from the LDAP server 200. Further, the print data administrator mail address 409 of the record is changed to the mail addresses of the authority transferred person the person "User2" and the person "User3" obtained from the LDAP server 200, respectively.

In the embodiment, the IC card reader 401 represents the print data deletion method specified when the administrative authority is transferred. When the print data deletion method is "delete when one of administrative authority transferred persons completes printing operation", "1" is stored in the IC card reader 401. When the print data deletion method is "delete when all of administrative authority transferred persons complete printing operation", "0" is stored in the IC card reader 401.

In the second embodiment, similar to the first embodiment, after the print data administration table 400 is updated, when the RFID card having the individual identification information of the authority transferred person is moved over the IC card reader 40, the authentication printing is performed. After the authentication printing is performed, the information of the authority transferred person is recorded in the log file 500 as the person who performs the authentication printing.

In the embodiment, when "1" is stored in the IC card reader 401 of the record whose administrative authority is transferred, that is, the print data deletion method is "delete when one of administrative authority transferred persons completes printing operation", the first mail is generated. In the first mail, the print data creating person and all of the administrative authority transferred persons are assigned in "Bcc:", and the information of the authentication print data 300A thus printed and the after print information are formed in the specific format.

In the embodiment, when "0" is stored in the IC card reader 401 of the record whose administrative authority is transferred, that is, the print data deletion method is "delete when all of administrative authority transferred persons complete printing operation", the first mail is generated. In the first mail, the print data creating person and the administrative authority transferred person who performs the printing operation are assigned in "Bcc:", and the information of the authentication print data 300A thus printed and the after print information are formed in the specific format. An example of the first mail is shown in FIG. 20 (described later).

In the embodiment, in the image forming apparatus 10, when "delete when one of administrative authority transferred persons complete printing operation" is selected as the print data deletion method, the print data creating person and all of the administrative authority transferred persons are notified with the first mail. After the authentication print data 300A with the administrative authority thereof transferred is printed, both of the print data creating person and the administrative authority transferred person who performs the printing operation are notified with the first mail. The first mail is transmitted to the SMTP server 201 through the network 70.

Accordingly, the print data creating person is capable of confirming that the printing operation is completed. Further, the administrative authority transferred person is capable of confirming that the print data creating person confirms that the printing operation is completed.

In the embodiment, upon transferring the administrative authority, when "delete when one of administrative authority transferred persons complete printing operation" is selected as the print data deletion method, it is possible to confirm that the image forming apparatus 10 deletes the authentication print data 300A after the printing operation is completed.

In the embodiment, when the IC card reader 401 is "0", the first mail is transmitted to the print data creating person and all of the administrative authority transferred persons. In this case, the first mail has the configurations similar to those of the print completion mail in the first embodiment shown in FIG. 14.

FIG. 20 is a schematic view showing the first mail to be transmitted from the image forming apparatus 10 when the administrative authority is transferred according to the second embodiment of the present invention. It is noted that the first mail shown in FIG. 20 is generated when the print data deletion method is "delete when one of administrative authority transferred persons complete printing operation".

As shown in FIG. 20, "Printer" is displayed in "From:" indicating the origination address of the first mail. Nothing is displayed in "To:" indicating the destination address of the first mail, and "Cc:" indicating the destination address of the copy. In "Bcc:" indicating the non-displayed destination address of the copy, "User1_Print data creating person<User1@XXXX.jp>", "User2_Administrative authority transferred person 1<User2@XXXX.jp>", and "User3_Administrative authority transferred person 2<User3@XXXX.jp>" are displayed. "Administrative authority transfer notification of authentication print" is displayed in "Title:" indicating the subject of the first mail.

Further, the main text of the first mail includes "This mail is sent from Printer. The administrative authority of the following authentication print is transferred from User1 to User 2 and User3 Date: 2010/10/02 17:25:37 Apparatus: Printer Document AuthDocument.text The accumulated authentication print data will be deleted when one of the users to whom the administrative authority is transferred performs the printing operation".

In the embodiment, when the print data deletion method is "delete when all of administrative authority transferred persons complete printing operation", the administrative authority transfer execution mail is generated. The administrative authority transfer execution mail is transmitted to the print data creating person and one of the administrative authority transferred persons. Accordingly, the administrative authority transfer execution mail has the configurations similar to those of the first mail shown in FIG. 13.

As described above, in the second embodiment, the image forming apparatus 10 is configured to notify the information of the authentication print data 300A with the administrative authority thereof transferred with the mail to the person who transfers the administrative authority and the person whom the administrative authority is transferred. Accordingly, similar to the first embodiment, it is possible to notify the fact that the administrative authority is transferred to the administrative authority transferred person. As a result, even when the administrative authority transferred person transfers the administrative authority to somebody else other than the print data creating person of the authentication print data 300A, it is possible for the print data creating person to confirm that the administrative authority is transferred.

FIG. 21 is a schematic view showing the second mail to be transmitted from the image forming apparatus 10 when the printing operation is completed according to the second embodiment of the present invention.

As shown in FIG. 21, "Printer" is displayed in "From:" indicating the origination address of the second mail. Nothing is displayed in "To:" indicating the destination address of the second mail, and "Cc:" indicating the destination address of the copy. In "Bcc:" indicating the non-displayed destination address of the copy, "User1_Print data creating person<User1@XXXX.jp>", "User2_Administrative authority transferred person 1<User2@XXXX.jp>", and "User3_Administrative authority transferred person 2<User3@XXXX.jp>" are displayed. "Completion notification of authentication print" is displayed in "Title:" indicating the subject of the second mail.

Further, the main text of the second mail includes "This mail is sent from Printer. The authentication print data with the administrative authority thereof transferred from User1 to User2 and User3 is completed, and the accumulated authentication print data is deleted Date: 2010/11/02 11:01:00 Apparatus: Printer (XXX.XXX.XXX.XXX) Printing person: User3 Document: AuthDocument.text Printed sheet number: 50".

As described above, in the second embodiment, in addition to the effect of the first embodiment, it is possible to transfer the administrative authority to a plurality of persons. Further, since the administrative authority is transferred to a plurality of persons, it is possible to specify the print data deletion method. More specifically, it is possible to select the method of deleting the print data when one of the specified persons performs the printing operation, or the method of deleting the print data when all of the specified persons perform the printing operation.

Accordingly, when the operator wants one of the specified persons to perform the printing operation, the operator selects the method of deleting the print data when one of the specified persons performs the printing operation. When the operator does not want for anyone to obtain the print data due to security or copyright consideration, but want the specified persons to obtain the printing result after authentication, the operator selects the method of deleting the print data when all of the specified persons perform the printing operation.

In the second embodiment, with the image forming apparatus 10 and the method of transferring the administrative authority of the authentication print data 300A, it is possible to obtain the following effects. First, after the operation of the authentication print is performed on the computer 100, it is possible to safely transfer the administrative authority of the authentication print data 300A to a plurality of the specified users.

Second, when the administrative authority is transferred, it is possible to select the method of deleting the print data when one of the specified persons performs the printing operation, or the method of deleting the print data when all of the specified persons perform the printing operation. Accordingly, the operator is capable of selecting the deletion method according to a circumstance of the printing operation.

It is noted that the present invention is not limited to the first and second embodiments described above, and various modifications are possible. The various modifications may include, for example, the following examples.

In the second embodiment, the image forming apparatus 10 is configured such that it is possible to select the method of deleting the print data when one of the specified users performs the printing operation, or the method of deleting the print data when all of the specified users perform the printing operation. Alternatively, the image forming apparatus 10 may be configured such that it is possible to select a method of deleting the print data when a specific number of the specified users perform the printing operation, or the method of deleting the print data when all of the specified users perform the printing operation.

In the first and second embodiments, the image forming apparatus 10 is configured such that the administrative authority the authentication print data 300A is transferred from the print data creating person to the administrative authority transferred person. The present invention is not limited thereto, and the image forming apparatus 10 may be configured such that it is possible to select move or copy of the administrative authority when the administrative authority is transferred. When the copy of the administrative authority is selected, both the print data creating person to the administrative authority transferred person are capable of obtaining the printing result.

In the first and second embodiments, the image forming apparatus 10 is configured such that the individual identification information is directly read from the RFID card. The present invention is not limited thereto, and the image forming apparatus 10 may be configured such that information corresponding to the individual identification information one on one such as an employee number or a membership number is read from the RFID card. Then, the information is converted to the individual identification information according to a database of the individual identification information, or a correlation chart of the individual identification information defined in advance.

In the first and second embodiments, the image forming apparatus 10 is configured such that the RFID card is used for the authentication and the printing operation. The present invention is not limited thereto, and the image forming apparatus 10 may be configured such that other type of input device capable of being converted to the individual identification information is used. For example, an ID and a password may be input through the operation panel 45 for the authentication. Alternatively, a biometric authentication device such as a fingerprint authentication device, an iris authentication device, and a vein authentication device may be used for the authentication.

In the first and second embodiments, the image forming apparatus 10 is configured such that the computer 100 transmits the authentication print data 300A, and the image forming apparatus 10 stores the authentication print data 300A. The present invention is not limited thereto, and the image forming apparatus 10 may be configured such that the authentication print data 300A is stored in a print server, and the image forming apparatus 10 is capable of being connected to the print server through the network 70, thereby constituting the system. Accordingly, it is not necessary to consider the installation location of the image forming apparatus 10 or the computer 100 when the administrative authority is transferred, thereby improving convenience. In this case, the authentication print data 300A is encrypted, and the authentication print data 300A thus encrypted is transmitted and received between the image forming apparatus 10 and the print server through the network 70.

In the first and second embodiments, the image forming apparatus 10 is configured such that the web browser 130 displays the data received from the web server unit 51 of the image forming apparatus 10 connected to the network 70 through the communication unit 120. Further, the data input through the keyboard and the mouse (not shown) is transmitted to the web server unit 51 of the image forming apparatus 10. The present invention is not limited thereto, and the external operation unit may be any operation unit capable of operating the image forming apparatus 10 through the network 70. For example, the external operation unit may include a special application or a special terminal capable of remotely controlling the image forming apparatus 10.

The disclosure of Japanese Patent Application No. 2011-094382, filed on Apr. 20, 2011, is incorporated in the application by reference.

While the invention has been explained with reference to the specific embodiments of the invention, the explanation is illustrative and the invention is limited only by the appended claims.

What is claimed is:

1. An image forming apparatus for receiving authentication print data and performing a printing operation, comprising:
   a print administration unit for printing the authentication print data when individual identification information matches to identification information of a print data administrator of the authentication print data;
   a server unit for providing a service relative to an instruction from an external operation unit through a network;
   an authentication unit for controlling the server unit to be capable of providing the service after a user of the external operation unit is authenticated; and
   a notification transmission unit for transmitting a notice through the network,
   wherein said authentication unit is configured to authenticate the user of the external operation unit and obtain the individual identification information,
   said server unit is configured to control the external operation unit to display the authentication print data to be selectable, and to control the external operation unit to display a first screen through which identification information of an authority transferred person, to whom administrative authority of the authentication print data is transferred, can be input when the individual identification information related to the user of the external operation unit matches to the identification information of the print data administrator of the authentication print data,
   said print administration unit is configured to correlate the identification information of the print data administrator of the authentication print data selected through the external operation unit to the identification information of the authority transferred person selected through the external operation unit,
   said notification transmission unit is configured to transmit a first notification to the authority transferred person rewritten to the print data administrator and a print data creating person when the print data administrator of the authentication print data is correlated, and
   said print administration unit is configured to correlate the identification information of the print data administrator of the authentication print data selected through the external operation unit to the identification information of the authority transferred person selected through the external operation unit when the identification information of the authority transferred person is input through the external operation unit after the print administration unit invalidates a correlation of a previous authority transferred person as the print data administrator of the authentication print data correlated before the identification information of the authority transferred person is input.

2. The image forming apparatus according to claim 1, wherein said notification transmission unit is configured to transmit a second notification to the authority transferred person and the print data creating person after the authentication print data is printed.

3. The image forming apparatus according to claim 1, wherein said server unit is configured to control the external operation unit to display a second screen through which the identification information of a plurality of the authority transferred persons can be input when the administrative authority is transferred, and it is possible to select whether a specific number of the authority transferred persons are allowed to perform the printing operation or all of the authority transferred persons are allowed to perform the printing operation,
   said notification transmission unit is configured to transmit the first notification to all or the specific number of the authority transferred persons who are allowed to perform the printing operation and the print data creating person through the external operation unit,
   said notification transmission unit is configured to transmit the second notification to the authority transferred persons and the print data creating person every time when each of the authority transferred persons completes the printing operation,
   said print administration unit is configured to delete permission information of the printing operation with regard to the authority transferred persons every time when each of the authority transferred persons completes the printing operation, and
   said print administration unit is configured to delete the permission information of the printing operation with regard to all of the authority transferred persons every time when the specific number of the authority transferred persons are allowed to perform the printing operation and complete the printing operation.

4. The image forming apparatus according to claim 1, wherein said authentication unit is configured to inquire with an LDAP (Lightweight Directory Access Protocol) server connected to the network so that the authentication unit obtains the individual identification information of the user of the external operation unit.

5. The image forming apparatus according to claim 1, wherein said server unit is configured to control the external operation unit to display the authentication print data, in which the user of the external operation unit is the print data administrator, as a first list, and to control the external operation unit to display the first screen through which the identification information of the authority transferred person, to whom administrative authority of the authentication print data is transferred, can be input, and said server unit is configured to control the external operation unit to display the first screen on which the authority transferred person, whose identification information is previously input by the user of the external operation unit input, is displayed as a second list.

6. The image forming apparatus according to claim 1, wherein said notification transmission unit is configured to request an SMTP (Simple Mail Transfer Protocol) server connected to the network to transmit to a specified notification address a first notification so that the notification transmission unit transmits the first notification and the second notification.

7. The image forming apparatus according to claim 1, further comprising a recording medium of a non-volatile type for storing the authentication print data.

8. The image forming apparatus according to claim 1, further comprising an operation unit for displaying a character and receiving an instruction of the user, said print administration unit being configured to control the operation unit to display the individual identification information when the individual identification information matches to the identification information of the print data administrator or the authority transferred person.

9. An information processing apparatus, comprising:

an obtaining unit for obtaining print data and first user identification information;

a storage unit for storing the first user identification information and the print data so that the first user identification information is correlated to the print data;

a receiving unit for receiving second user identification information; and a control unit for determining whether information corresponding to the second user identification information is correlated to the print data when the receiving unit receives the second user identification information, wherein said control unit is configured to allow a printing of the print data when the information is correlated to the print data, said control unit is configured to restrict the printing of the print data when the information is not correlated to the print data, said obtaining unit is configured to obtain third user identification information as well as an authority transfer instruction when the obtaining unit obtains the print data, said control unit is configured to invalidate a correlation between the first user identification information and the print data when the obtaining unit obtains the authority transfer instruction, and said control unit is configured to control the storage unit to store the third user identification information and the print data so that the third user identification information is correlated to the print data when the obtaining unit obtains the authority transfer instruction.

* * * * *